US011864672B2

(12) United States Patent
Ganter

(10) Patent No.: US 11,864,672 B2
(45) Date of Patent: Jan. 9, 2024

(54) ILLUMINATED DOUBLE WALL LENS INDICIA DRINKING VESSEL

(71) Applicant: Frost Holdings, LLC, Birmingham, AL (US)

(72) Inventor: Christopher R Ganter, Birmingham, AL (US)

( * ) Notice: Subject to any disclaimer, the term of this patent is extended or adjusted under 35 U.S.C. 154(b) by 0 days.

(21) Appl. No.: 18/096,522

(22) Filed: Jan. 12, 2023

(65) Prior Publication Data

US 2023/0148774 A1 May 18, 2023

Related U.S. Application Data

(63) Continuation of application No. 16/562,330, filed on Sep. 5, 2019, now abandoned.

(51) Int. Cl.

| | |
|---|---|
| ***A47G 19/22*** | (2006.01) |
| ***F21V 33/00*** | (2006.01) |
| ***F21L 4/02*** | (2006.01) |
| ***F21L 4/08*** | (2006.01) |
| ***F21V 23/04*** | (2006.01) |
| ***F21V 17/00*** | (2006.01) |

(Continued)

(52) U.S. Cl.

CPC ..... *A47G 19/2227* (2013.01); *A47G 19/2288* (2013.01); *F21L 4/027* (2013.01); *F21L 4/085* (2013.01); *F21V 3/00* (2013.01); *F21V 17/002* (2013.01); *F21V 23/0414* (2013.01); *F21V 33/0036* (2013.01); *A47G 2019/2238* (2013.01); *A47G 2019/2244* (2013.01); *A47G 2200/08* (2013.01); *F21Y 2113/17* (2016.08); *F21Y 2115/10* (2016.08)

(58) Field of Classification Search

CPC ............ A47G 19/2227; A47G 19/2288; A47G 2019/2238; A47G 2019/2244; A47G 2200/08; F21L 4/027; F21L 4/085; F21V 3/00; F21V 17/002; F21V 23/0414; F21V 33/0036; F21Y 2113/17; F21Y 2115/10

See application file for complete search history.

(56) References Cited

U.S. PATENT DOCUMENTS

2005/0045615 A1 * 3/2005 Sanoner ............. A47G 19/2288 219/387

* cited by examiner

*Primary Examiner* — Anne M Hines
*Assistant Examiner* — Jose M Diaz
(74) *Attorney, Agent, or Firm* — Christopher R. Ganter, LLC

(57) ABSTRACT

A double walled illuminated vessel for displaying indicia comprising an outer sleeve, an inner liner, a lens, a transparent or translucent connection ring, a base and an illumination module adapted to be inserted into the base whereby the base and connection ring are connected to each other creating a base illumination unit. Light from the illumination module passes through the hollow space between the outer sleeve and the inner liner such that the lens bearing indicia is illuminated thus prominently displaying any desired graphic, logo, design, trademark, symbol, letter, number or any other indicia. The connection ring transmits and diffuses light through the inner liner and upper rim as well as the sidewall of the connection ring. The base illumination unit is removable from the outer sleeve and can be used as an independent light source by a user. Additionally, the illumination module is rechargeable in one embodiment and can provide an adequate charge to a mobile device. Further embodiments provided for a removable lens or lens unit.

17 Claims, 21 Drawing Sheets

(51) Int. Cl.

| | |
|---|---|
| ***F21V 3/00*** | (2015.01) |
| ***F21Y 113/17*** | (2016.01) |
| ***F21Y 115/10*** | (2016.01) |

ILLUMINATED DOUBLE WALL LENS INDICIA DRINKING VESSEL

CROSS-REFERENCE TO RELATED APPLICATIONS:

This application is a continuation of U.S. Non-Provisional application U.S. Non-Provisional Application 16/562330 filed on Sep. 5, 2019 what was a continuation-in-part application of U.S. Non-Provisional Patent Application number 15/626746 filed on Jun. 19, 2017 and claims priority to U.S. Provisional Application No. 62/351656 filed on Jun. 17, 2016, U.S. Provisional Application No. 62/471329 filed on Mar. 14, 2017, and U.S. Non-Provisional Application No. 15/626746 filed on Jun. 19, 2017 in their entirety.

FIELD OF THE INVENTION

The invention relates to a double walled insulated drinking vessel that allows for illumination of certain portions of the drinking vessel and more particularly illumination of at least one lens bearing indicia in the side of the vessel, illumination of a connection ring at the base of the vessel, and illumination of a top rim and lid while simultaneously providing adequate insulation of a desired liquid.

BACKGROUND OF THE INVENTION

Double walled insulated drinking vessels exist in the prior art, however, there are none that allow for illumination of the base of the vessel, illumination of an indicia lens located in the sidewall, and illumination of the top rim and lid of the vessel whereby the light source is located solely in the bottom of the cup. The present invention allows for and promotes the display of a desired branding, logo, graphic or indicia to be displayed in a distinct location on the side of a vessel such that it is illuminated without the remainder of the vessel being illuminated. Currently, there are vessels in the art that have illumination incorporated therein, but they illuminate the entire vessel through transparent or translucent vessel materials used in their manufacture. These vessels cannot prominently illuminate and display a desired branding, logo, or indicia because the light is diffused throughout their entire vessel and is therefore lost and does not adequately illuminate and contrast a distinct branding, logo or indicia area with the remainder of the vessel outer surface. Further, these vessels can only use or incorporate transparent or translucent materials in their sidewalls or outer surface. Use of metal or non-transparent material in previous vessels would defeat the purpose for which they were intended. The present invention can use metal or other non-transparent solid color plastic materials in their construction, thus offering a better insulated product, a more durable product and a product that can adequately display an indicia on a lens with sufficient brightness and contrast with the remainder of the exterior of the vessel.

The present invention further allows a user to remove a base illumination unit from the vessel such that it can be used independently as a flashlight or lantern. No other vessel in existence has the capability of illuminating a lens in the sidewall of a vessel or vessel while also serving as a separate and independently functional lighting device. In addition, the base illumination unit is rechargeable and can also be used to re-charge a user's mobile device to an acceptable operating level.

SUMMARY OF THE INVENTION

In view of the limitations of existing drinking vessels or vessels, the present invention provides an improved and novel means to illuminate a vessel and a desired indicia in a prominent fashion. The invention provides many other novel advantages and features not currently seen in the field of drinking vessels as will be shown and disclosed below.

In one embodiment, the present invention is a double walled drinking vessel having an inner liner, an outer sleeve, an aperture in the outer sleeve shaped to accommodate an indicia lens, a connection ring, a base, a light source and power source located in the base of the vessel and a switch. The connection ring is transparent or translucent and illuminated by use of a light source and battery located in the base of the vessel. The connection ring, due to its transparent or translucent nature, allows light to travel through it and projects into the hollow space in between the inner liner or inner cup and the outer sleeve such that it allows illumination of the indicia lens which is transparent or translucent and also allows illumination of the top edge or lip of the vessel as well as a lid for the vessel. In one embodiment, the inner liner is also transparent and translucent further enhancing and communicating the light emanating from the base and through the connection ring. The lens is the means by which any number of branding information, logos, trademarks, designs, symbols, graphics, letters or numbers and hereinafter referred to as "indicia" will be displayed by a number of different means. One means by which these indicia will be displayed is by printing the desired indicia on the outer surface of the lens in various colors by the method of pad printing, screen printing, painting, or applying a translucent or transparent color sticker. Another means is forming the indicia out of various color acrylic, polycarbonate, plastic or styrene butadiene copolymers which can be used alone or in blends with crystal polystyrene and then adhering the indicia to the lens. Another means to accomplish the indicia is to inject various colored plastics into a mold to form the lens along with the desired indicia. The connection ring, lens, inner liner, and lid can be formed out of white or color acrylic, polycarbonate, plastic or styrene butadiene copolymers which can be used alone or in blends with crystal polystyrene, and other similar plastics that exhibit transparent or translucent properties.

The light source and battery located in the base can be at minimum a single light and power source connected to a switch that a user can actuate on the bottom of the base. In a more advanced and superior embodiment, an illumination module is inserted into the base. The illumination module is a printed circuit board that is circular in shape and has an array of light emitting diodes mounted on the outer perimeter of the circuit board such that they are in a circular array. The illumination module further has a switch on its underside. The illumination module has a logic gate for determining when a tactile switch is pressed, an optional electronic switch, a plurality of light emitting diodes in parallel connection, a universal serial bus connector, a charge controller and a two pin battery connector. The battery used in one embodiment would be a rechargeable lithium polymer battery mounted to the upper surface of the illumination module. The base unit has a charge aperture located in its sidewall and a switch aperture located in its bottom.

Specific advantages and features of the present assembly will be apparent from the accompanying drawings and the description of several illustrative embodiments of the present invention.

It should be understood that the present drawings are not necessarily to scale and that the embodiments disclosed herein are sometimes illustrated by fragmentary views. It should also be understood that the invention is not necessarily limited to the particular embodiments illustrated herein.

DETAILED DESCRIPTION

The invention is generally depicted in FIGS. 1-20 but may be embodied in various other forms. The principles and teachings of the invention, therefore, can be applied to numerous alternative variations. The vessel described herein can be a cup, bottle, tumbler, mug, glass, container or any other similar vessel used for the storage of a liquid for drinking purposes. The terms aperture, cut-out, hole or opening can be used interchangeably in the specification. The terms outer sleeve and outer wall can be used interchangeably in the specification.

Figure 2:
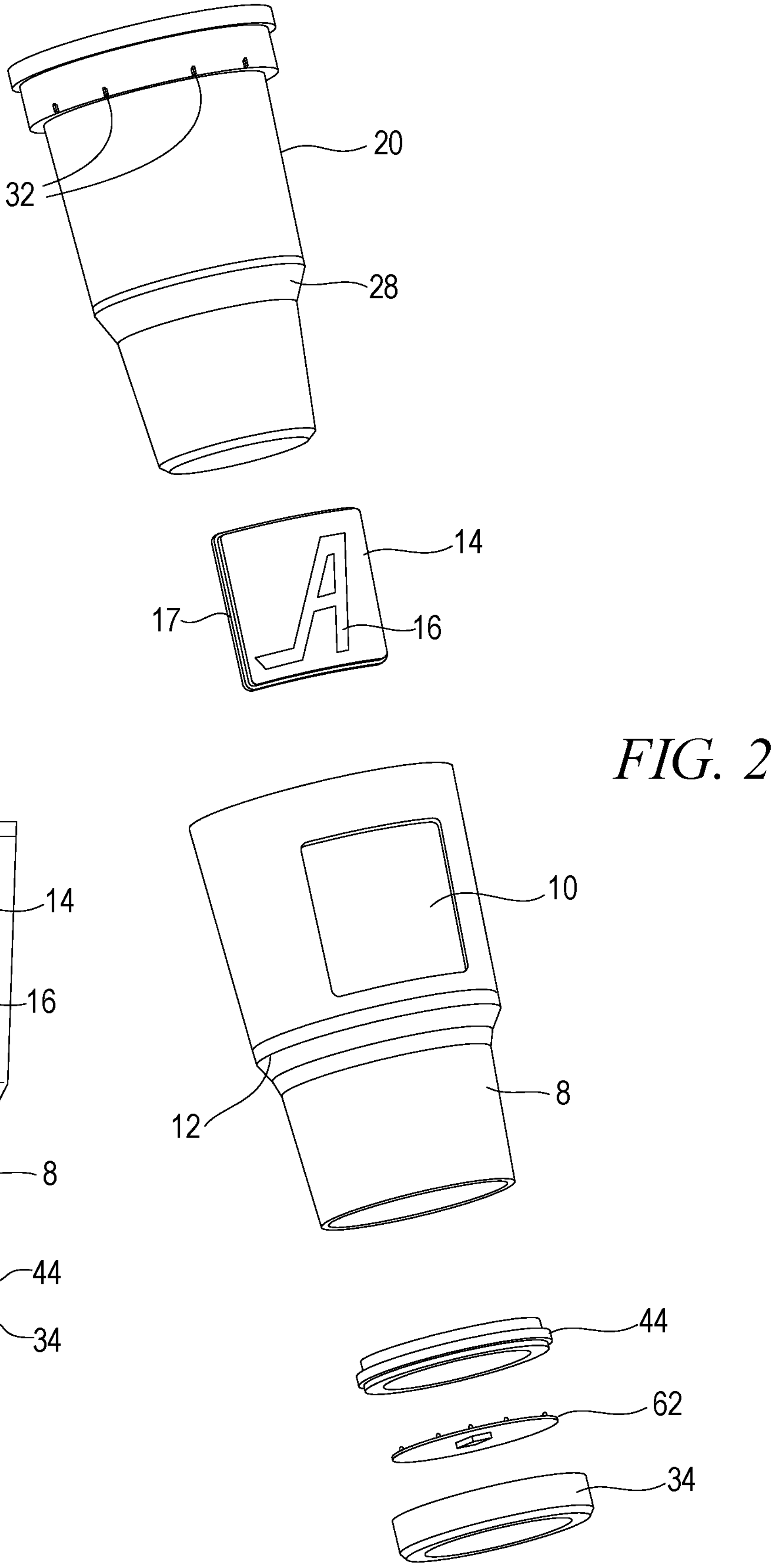
FIG. 2 shows an exploded perspective view of one embodiment of the vessel components.
Figure 1:
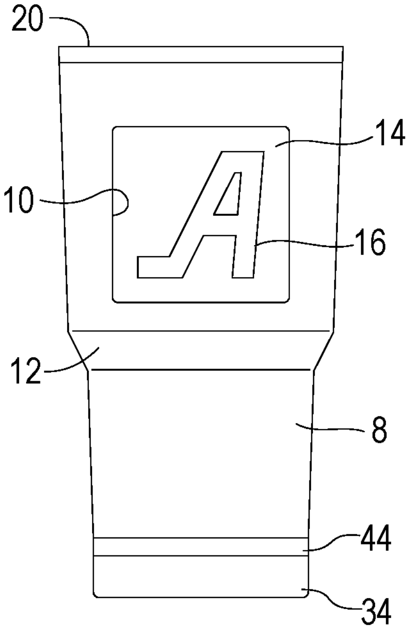
FIG. 1 is a side elevation of the vessel fully assembled.

Referring now to FIGS. 1-2, there is shown an assembled and exploded perspective view of a preferred embodiment of the vessel 6. There is shown an inner liner 20, a lens 14 having an indicia 16 displayed on the lens 14, an outer sleeve 8, an aperture 10 formed in the outer sleeve 8 to receive the indicia lens 14, a connection ring 44 and the base 34. In one embodiment of the vessel 6 these items can be disassembled such that the vessel 6 can be washed and can also be disassembled for interchangeability of an alternate lens 14 bearing a different indicia. In another embodiment, the vessel shown in FIGS. 1-2 are bonded together with an adhesive with a light, a rechargeable battery and switch located in the base 34 and as further shown in FIG. 18. The outer sleeve 8 can be made of any suitable material including metal and various types of plastic, however, metal provides the most stability and structural integrity to the vessel 6. The indicia 16 lens 14 can be formed of acrylic, polycarbonate or other transparent or translucent similar plastic material such as styrene butadiene copolymers which can be used alone or in blends with crystal polystyrene. The aperture 10 can be formed in virtually any shape in the outer sleeve 8 but rectangular and/or circular shapes would be the most efficient. In addition, more than one aperture 10 can be formed in the outer sleeve 8 to allow a plurality of lens 14 and indicia 16 to be displayed on the sidewall of the outer sleeve 8. The aperture 10 can be formed by stamping or cutting the aperture 14 out of the outer sleeve 8 in a metal version and in a plastic version of the outer sleeve 8 can be molded to have the aperture 10 formed in it or the aperture 10 can be cut out.

The inner liner 20 corresponds in shape to the outer sleeve 9 but has a correspondingly smaller diameter than the outer sleeve 8 which allows there to be a hollow space between the inner liner 20 and the outer sleeve 8 for purposes of insulative air space and also for a pathway to allow light to transmit through the hollow space to illuminate both the lens 14 and the inner liner 20. In one embodiment, the outer sleeve 8 and inner liner 20 have corresponding shoulders 12 and 28. In another embodiment, the outer sleeve 8 and inner liner 20 have either a corresponding tapered shape or a corresponding vertical shape.

Figure 4:
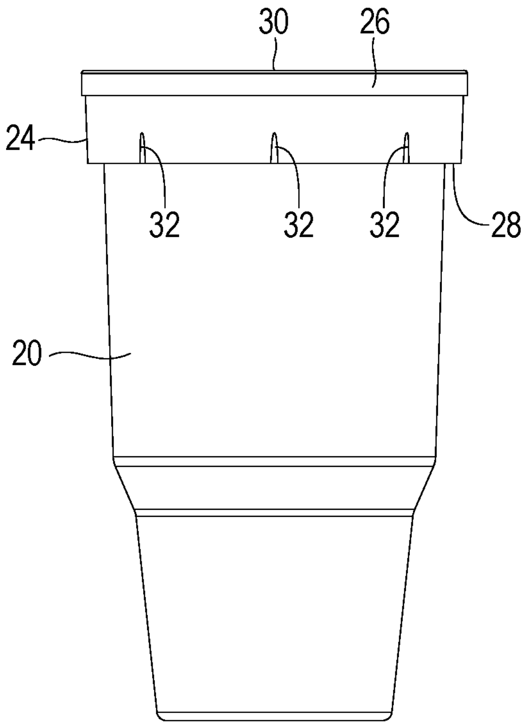
FIG. 4 is a side elevation of the inner liner of the vessel.
Figure 6:
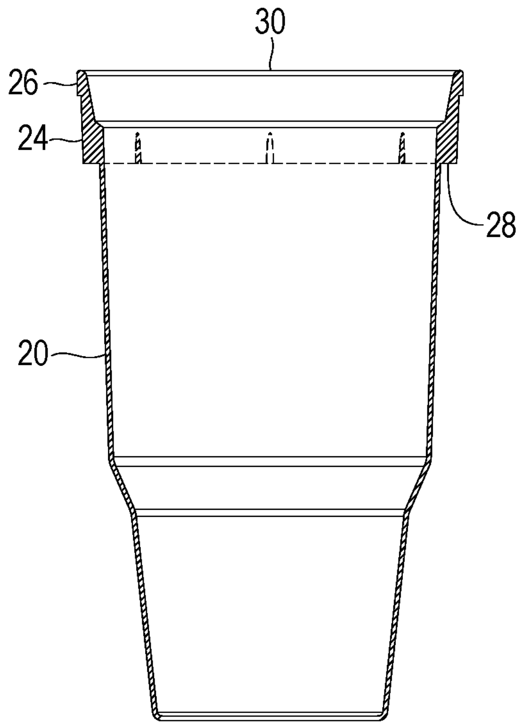
FIG. 6 is a cross sectional view along the plane 6-6 as shown in FIG. 5.

The inner liner 20 attaches to the outer sleeve 8 either by an individual upper connector ring 104 using an adhesive as shown in U.S. Provisional Application No. 62/351656 in one embodiment, or by forming an annular lip 26 and ring 24 at the top of and integral with the inner liner 20 as shown in FIG. 4 and FIG. 6 such that the inner liner 20 frictionally joins to the outer sleeve 8 and the sidewall of the outer sleeve 8 butts up flush to the annular lip 26 such that there is smooth connection. Ridges 32 located on the inner liner 20 ring 24 aid in the frictional connection of the inner liner 20 by compressing the ridges against the outer sleeve 8. In this embodiment, the inner liner 20 would be formed of a transparent or translucent plastic and one particularly suitable material is styrene butadiene copolymers which can be used alone or in blends with crystal polystyrene. Additionally, polycarbonate or acrylic material is suitable choice as the inner liner 20 material as well as other suitable plastic materials and including glass.

Figure 3:
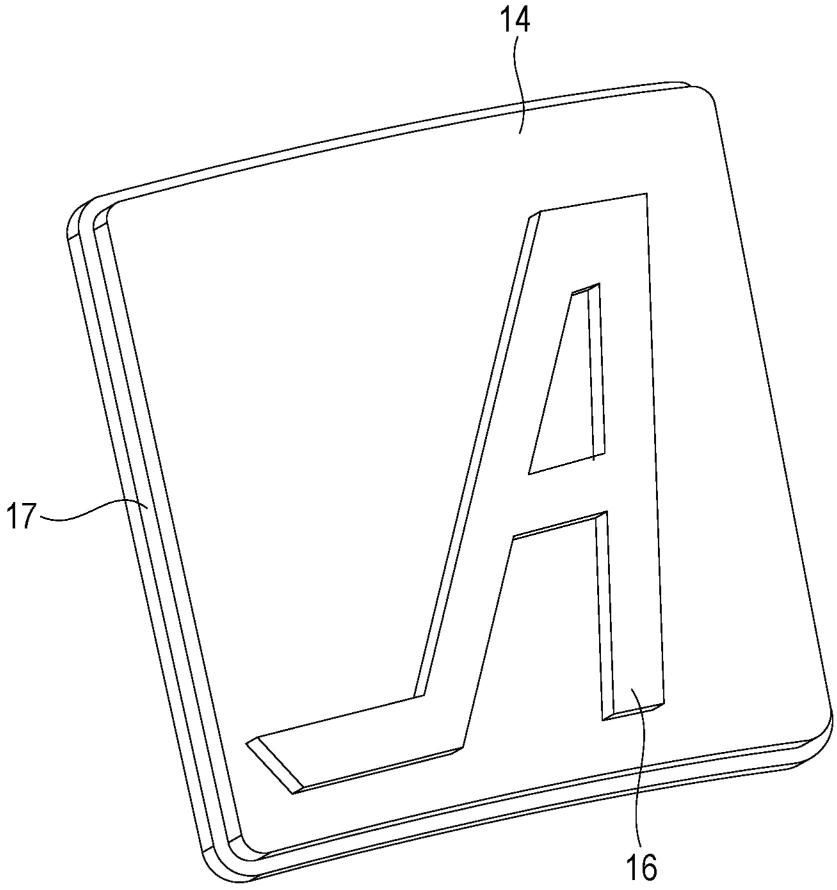
FIG. 3 shows a perspective view of the indicia lens.

Referring now to FIG. 3, the lens 14 has a curvature that corresponds to the outer sleeve 8 curvature such that a uniform outer curvature is achieved when the lens 14 is installed within the aperture 10. As shown in FIG. 3, the lens 14 has indicia 16 and also has a lip 17 that allows the lens 14 to be secured within the aperture 10 by way of the lip 17 being trapped behind the outer sleeve 8. To install the lens 14, it is placed in the aperture 10 cut out of the sidewall of the outer sleeve 8 face down such that the indicia 16 is facing outwards for view by a user. To aid in installation the outer sleeve 8 is tilted such that the aperture 10 is on the bottom side of the outer sleeve 8 and facing the ground. The lens 14 is then installed in the aperture 10. In this position the lens 14 will maintain its position due to the law of gravity and the inner liner 20 can be inserted thereby locking the lens 14 between the inner liner 20 and the outer sleeve 8 but allowing the lens 14 to be removed should a user want to change it with another lens 14 with different indicia 16. Depending on the embodiment chosen as revealed by this specification, the lens 14 can be joined to the inner surface of the outer sleeve 8 at the point of contact with the lens 14 with an adhesive. In one embodiment, the inner liner 20 can also be made out of photo-luminescent material such that the inner liner 20 can glow in the dark and continue to illuminate the lens 14 indicia 16 after the vessel 6 light is turned off. Further, at least one light located in the base 34 can be an ultra-violet light as this type of light most rapidly charges the photo-luminescent material. Further, the ultra violet light would create a different and unique effect on the inner liner 20, lens 14, rim 30 and lid.

Figure 5:
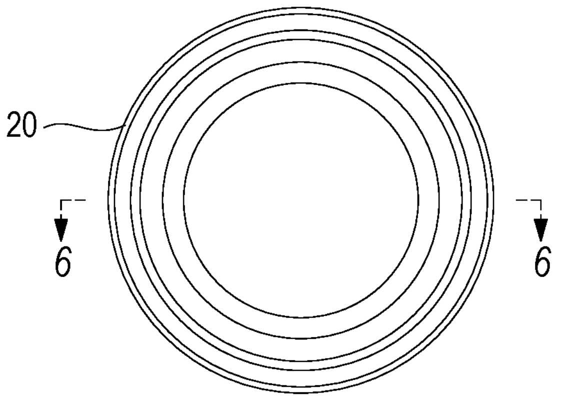
FIG. 5 is a top plan view of the inner liner.

Referring now to FIGS. 4-6, there is shown the inner liner 20 having a ring 24 formed at the top and integral with the inner liner 20. Above and adjacent to the ring 24 is the annular lip 26 and adjacent to the annular lip 26 is the rim 30. Also shown is a shoulder 28 at the junction of the ring 24 and the sidewall of the inner liner 20. The ring 24 allows the inner liner to be adjoined to the outer sleeve 8 without the use of a separate upper connection ring and occupies the space between the inner liner 20 and outer sleeve 8. Ridges 32 are also shown. The inner liner 20 can have a downward taper as depicted. Regarding FIG. 6, there is shown the particular shape of the ring 24 and annular lip 26 located on the top of the inner liner 20.

Figure 7:
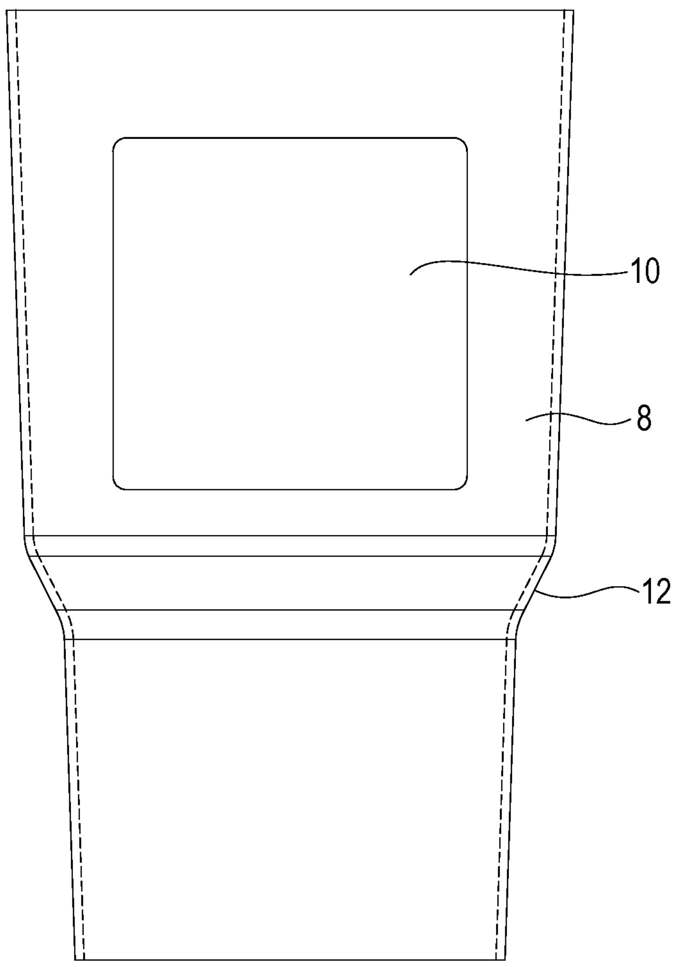
FIG. 7 is a side elevation of the outer sleeve.

Referring now to FIG. 7, there is shown the outer sleeve 8 with an aperture 10 and shoulder 12. Also shown are threads 18 that allow connection with the connection ring 44 as shown and described below. In an alternate embodiment, the threads 18 can be a threaded sleeve inserted and adhered to the bottom inner surface of the out the outer sleeve 8.

Figure 8:
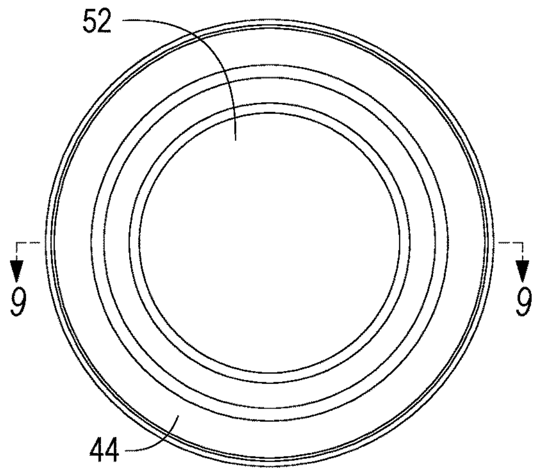
FIG. 8 is a top plan view of the connection ring.
Figure 9:
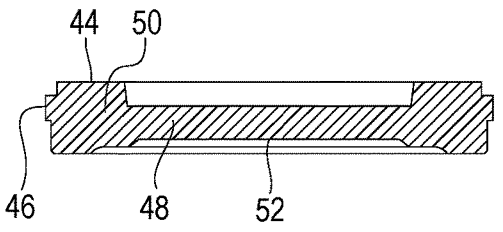
FIG. 9 is a cross sectional view along the plane 9-9 as shown in FIG. 8.

Referring now to FIGS. 8 & 9, there is shown the connection ring 44 and a cross-section thereof. The connection ring 44 is shaped generally like a disc or wafer and is circular in shape. The connection ring 44 can be translucent or transparent and made of a material such as acrylic, polycarbonate or styrene butadiene copolymers which can be used alone or in blends with crystal polystyrene. A light source as more fully discussed below will be positioned below the connection ring 44. In addition, the connection ring 44 can be made of any translucent or transparent colored material for a desired effect on the remainder of the vessel 6 appearance. This allows for use of a standard white light such as light emitting diode without the need to resort to use of a colored light emitting diode. However, in other embodiments, colored light emitting diodes or red-green-blue-white light emitting diodes and ultra-violet light emitting diodes can also be used in the base 34 below the connection ring 44 to allow a user to change the color of the light emitted through a clear non-colored connection ring 44.

Figure 10:
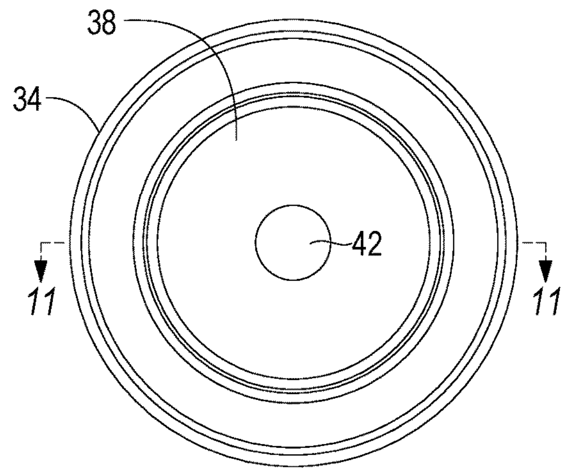
FIG. 10 is a top plan view of the base.
Figure 11:
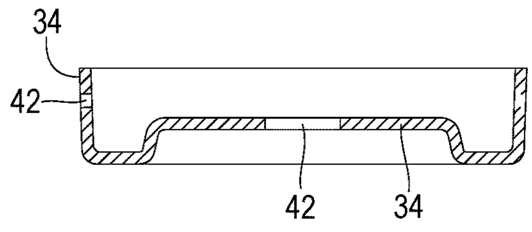
FIG. 11 is a cross-sectional view of the base along the plane 11-11 as shown in FIG. 10.
Figure 12:
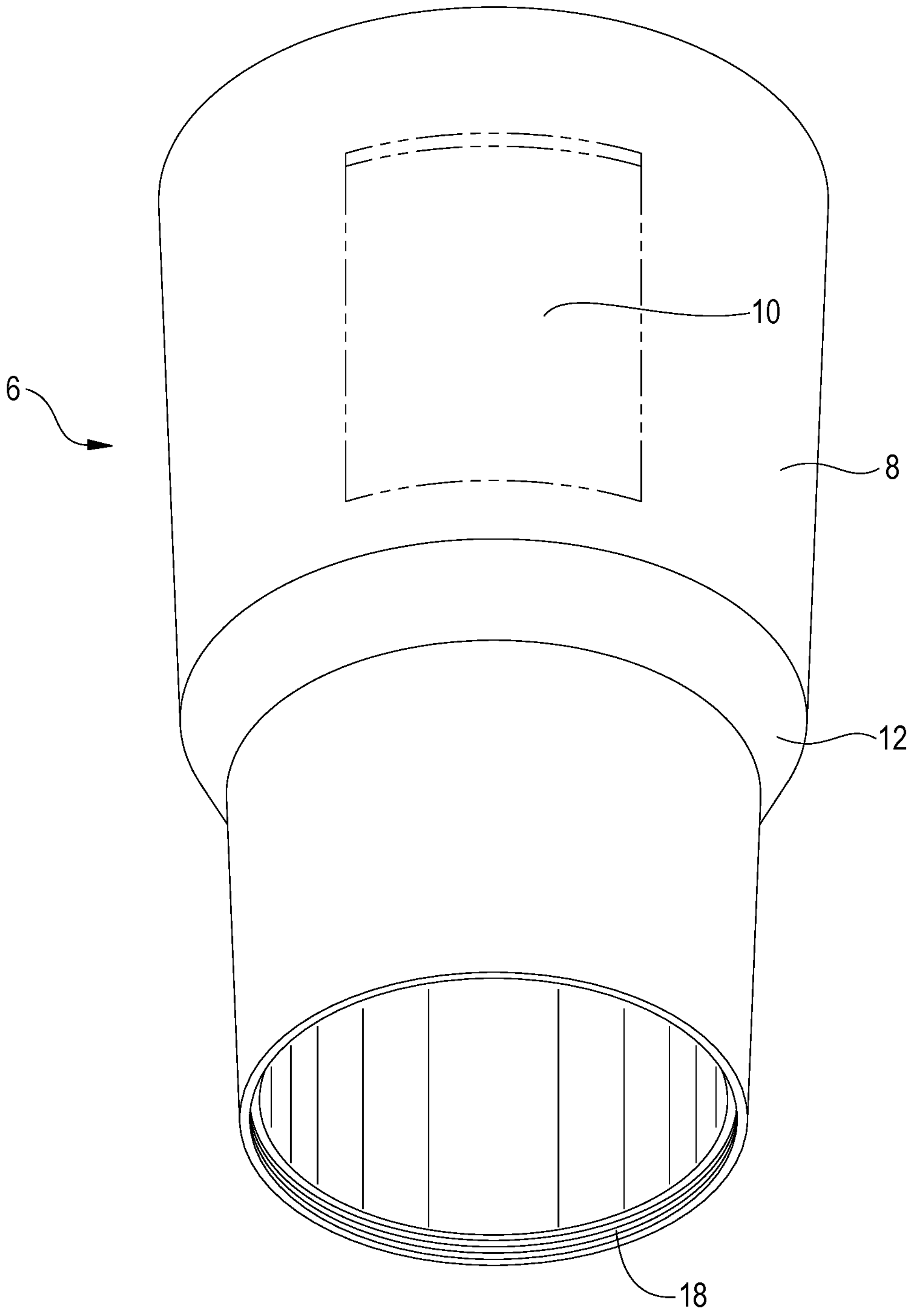
FIG. 12 is perspective view of the outer sleeve and the bottom interior opening

Referring now to FIGS. 10 & 11 there is shown a top plan view and cross sectional side view of the base 34. The base 34 has a charge aperture 40 located in its sidewall 36 and a switch aperture 42 located in its bottom surface 38. The base 34 is the location where a light, battery and switch will be located since it occupies the space directly beneath the connection ring 44 which acts as a light transmitter and diffuser.

As shown in the various embodiments of the connection ring 44 depicted in FIGS. 13-16, the connection ring 44 has an upper portion 48, an annular lip 46 in its middle region and a lower portion 50 and a recess 52 on its upper portion for proper seating of the inner liner 20 onto the connection ring 44. The connection ring 44 is the support structure that holds the outer sleeve 8 and base 34 together in rigid connection and also allows the uniform transmission of light through the connection ring 44 and into the space between the outer sleeve 8 and inner liner 20. The connection ring 44 would be made by means of injection molding, however, other methods such as machining may be used as well. The annular lip 46 on the sidewall of the connection ring 44 creates a first shoulder between it and the upper portion 48 of the connection ring 44 and a second shoulder between the annular lip 46 and the lower portion 50 of the connection ring 44. These shoulders allow the outer sleeve 8 and the base 34 to be installed upon the connection ring 44 such that they result in a flush outer surface on the exterior bottom sidewall of the vessel 6.

Using the embodiment of the connection ring 44 shown in FIGS. 8 & 9, the connection ring 44 is connected to the base 34 on its lower portion 50 and is connected to the outer sleeve 8 and inner liner 20 on its upper portion 48. In one embodiment, the connection ring 44 is permanently connected to the base 34 after insertion of a light source via insertion of the lower portion 50 into the base 34 and by means of an adhesive such as glue, epoxy, resin or other suitable adhesive for the particular materials used in the manufacture of the base 34 and the connection ring 44. The upper portion 48 of the connection ring 44 is then inserted into the outer sleeve 8 bottom and connected by using an adhesive.

Figure 16:
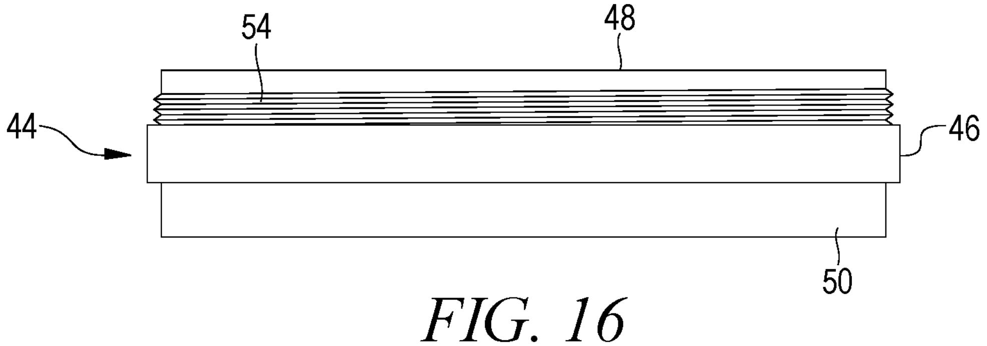
FIG. 16 is a side elevation of an embodiment of the connection ring.
Figure 17:
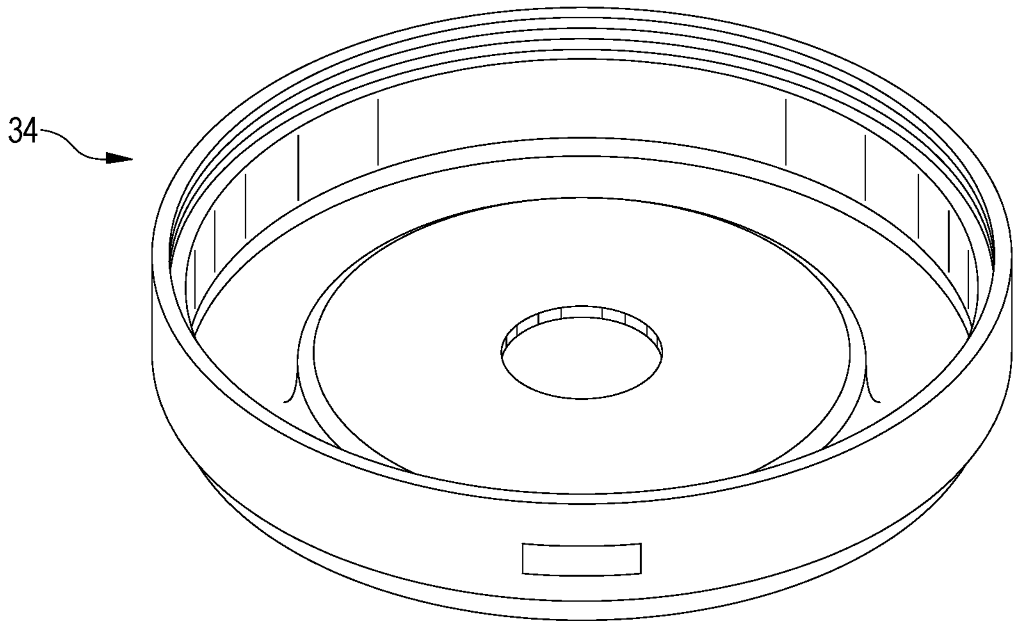
FIG. 17 is a perspective view of an embodiment of the base.
Figure 18:
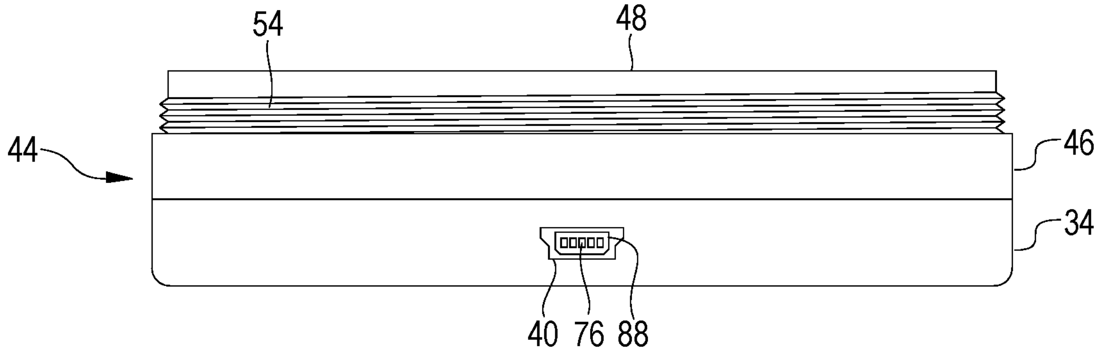
FIG. 18 is a side elevation of the base illumination unit.

In an alternate embodiment as shown in FIG. 16, after insertion of a light source and rechargeable battery into the interior of the base 34, the base 34 is permanently connected to the connection ring 44 using an adhesive and the upper portion 48 of the connection ring 44 is removably connected to the outer sleeve 8 by means of threads 54 on the connection ring 44 upper portion 48 sidewall and threads 18 located on the interior bottom sidewall of the outer sleeve 8 such that a threaded connection is achieved and as shown in FIGS. 18. This removable connection allows the base 34 and connection ring 44 unit to become a removable base illumination unit 84 that be can be removed and used independently from the vessel 6 and as shown in FIG. 18.

Figure 15:
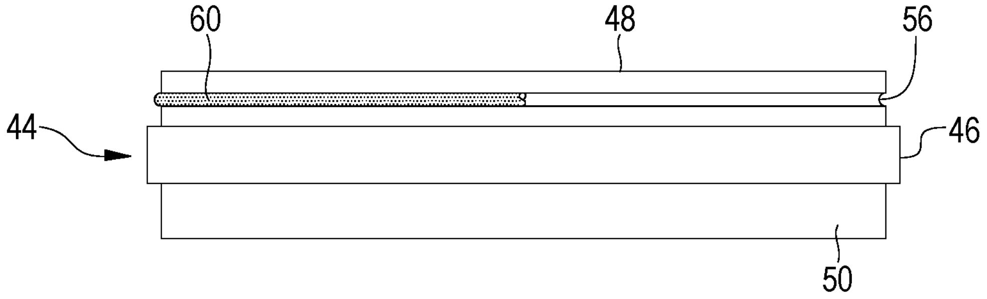
FIG. 15 is a side elevation of an embodiment of the connection ring.

In another embodiment, and as shown in FIG. 15, after insertion of a light source and rechargeable battery into the interior of the base 34, the base 34 is permanently connected to the connection ring 44 using an adhesive and the upper portion 48 of the connection ring 44 is removably connected to the outer sleeve 8 by use of a gasket 60 that is insertable into an annular channel 56 formed on the outer edge of the upper portion 48 of the connection ring 44. The gasket along with the appropriate amount of tolerance between the outer sleeve 8 and the connection ring 44 upper portion 48 would allow a rigid connection of the base 34 and connection ring 44 which can otherwise be referred to as the base illumination unit 84 as shown in FIG. 18. Both the threaded means and the gasket means are the means of attachment and detachment of the base illumination unit 84 from the outer sleeve 8.

Figure 13:
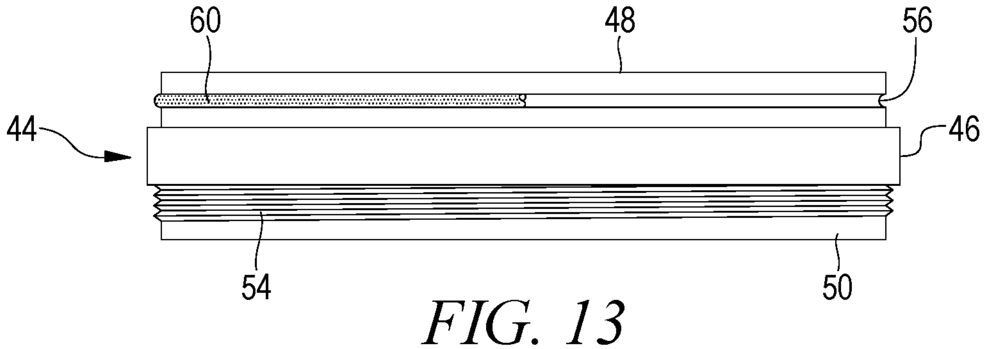
FIG. 13 is a side elevation of an embodiment of the connection ring.
Figure 14:
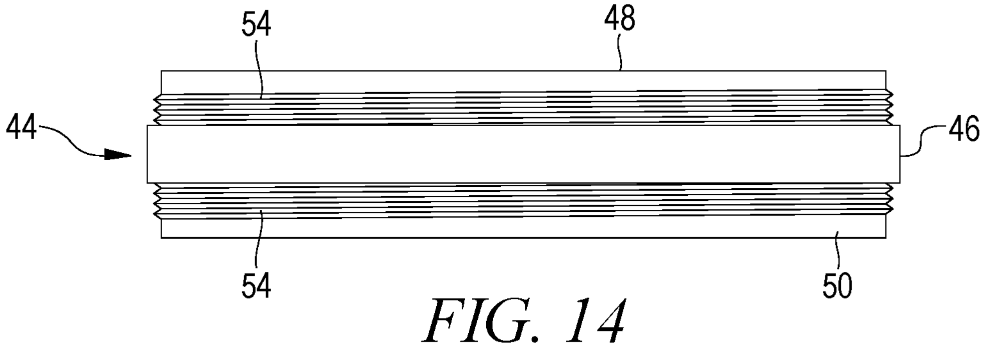
FIG. 14 is a side elevation of an embodiment of the connection ring.

In a further embodiment, and as shown in FIG. 13 both the base 34 and the outer sleeve 8 can be removably connected from the connection ring 44 by having threads 54 on the upper portion 48 of the connection ring 44 corresponding to threads 18 on the outer sleeve 8 as shown in FIG. 7 and threads on the lower portion 50 of the connection ring 44 corresponding to threads on the interior of the base 34 sidewall 36. In an even further embodiment as shown in FIG. 14, the upper portion 48 of the connection ring 44 is removably connected to the outer sleeve 8 by use of a gasket 60 that is insertable into an annular channel 56 formed on the outer edge of the upper portion 48 of the connection ring 44 and threads on the lower portion 50 of the connection ring 44 corresponding to threads on the interior of the base 34 sidewall 36 allow removable connection of the connection ring and base. The gasket 60 along with the appropriate amount of tolerance between the outer sleeve 8 and the connection ring 44 upper portion 48 would allow a rigid connection of the base 34 and connection ring 44 which can otherwise be referred to as the base illumination unit 84 as shown in FIG. 18. This embodiment allows a user to use the base illumination unit 84 as an independent light source and to also have the ability to change batteries located in the base illumination unit 84. This allows a user to remove the base illumination unit 84 as desired for use as an independent light or lantern or for purposes of cleaning the vessel 6. Also shown in FIG. 16 is the charge aperture 40 and a USB connector port 76 and a seal inserted in between the USB connector port 76 and the charge aperture 40 to protect the illumination module 62 as described below.

Figure 19:
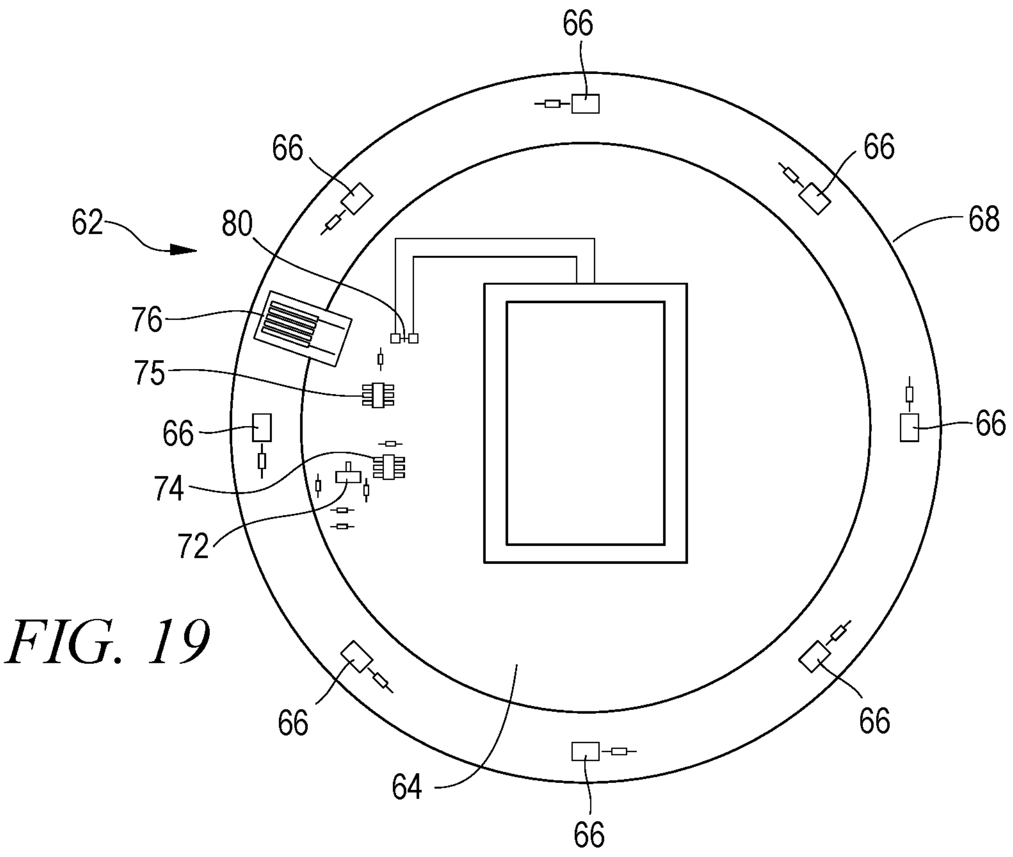
FIG. 19 is a top plan view of the illumination module.
Figure 20:
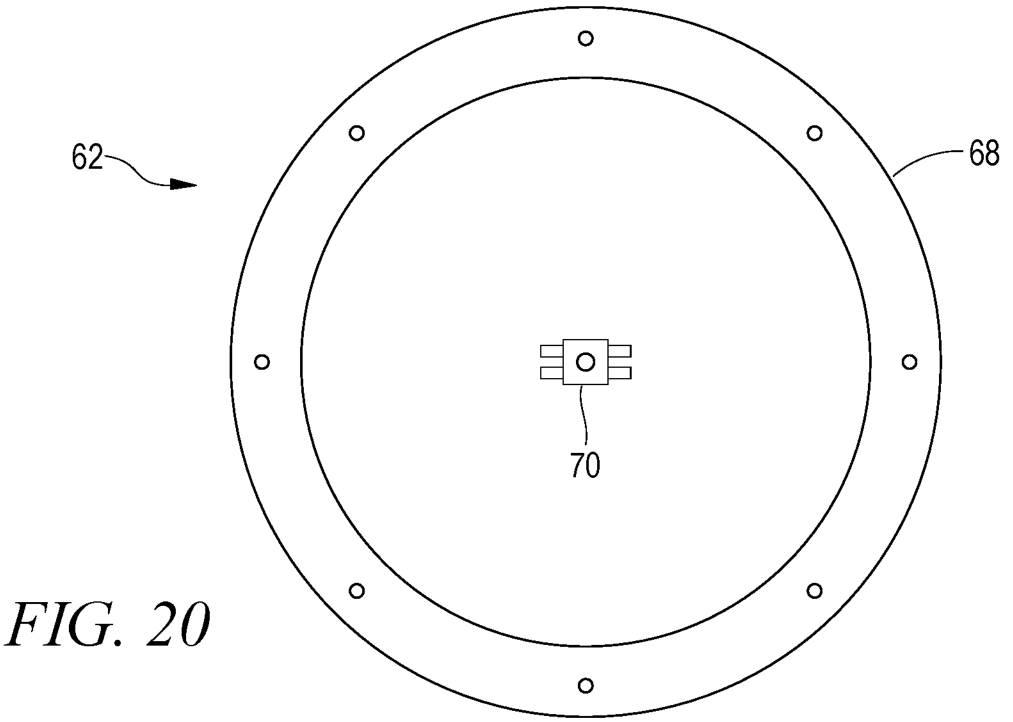
FIG. 20 is a bottom plan view of the illumination module.

Referring now to FIGS. 19-20 there is shown a top plan view and bottom plan view of the illumination module 62. The illumination module has a circuit board 64 in a circular shape having a circular array of light emitting diodes (hereinafter "LED") 66 located on the outer edge 68 of the circuit board 64 and positioned to emit light upwards. The light emitting diodes 66 can be at least one of a white light emitting diode, a red light emitting diode, a green light emitting diode, a blue light emitting diode, an ultra-violet light emitting diode, a red-green-blue light emitting diode, and a red-green-blue-white light emitting diode. The switch 70 is located on the bottom side of the circuit board 64 such that it can communicate with the switch aperture 42 in the base 34. The switch 70 in one embodiment is a tactile switch. The switch 70 will employ use of a rubber button or other similarly characteristically situated material that will be inserted into the switch aperture 42 of the base 34 and glued to the bottom interior of the base 34. The rubber button will protrude out of the bottom of the base 34 and allow a user to actuate the 70 switch while protecting the illumination module 62 from the elements. The illumination module 62 is sized so as to fit inside the base 34 with the USB connector 76 on the illumination module 62 and is aligned with the charge aperture 40 on the base 34 and the switch 70 aligned with the switch aperture 42 on the base 34. Also shown is the battery 82 which in the shown embodiment is a rechargeable lithium polymer ion battery. However, the battery 82 can be of many different types such as commonly used alkaline AAA batteries that would enable a user to replace the battery(s) 82. Alkaline, nickel metal hydride, or lithium batteries 82 in the AAA or AA form may be used as well as use of rechargeable batteries 82 of the type just listed. Mounting for said batteries 82 is well known for those skilled in the art of making and manufacturing battery 82 enclosures such that the batteries are in either series or parallel.

Additionally, a Bluetooth chip or module can be installed onto the circuit board 64 to allow communication with the illumination module 62 through use of a mobile device or other device with Bluetooth capability. In addition, connected to the Bluetooth module and illumination module 62 are optional micro speakers that can be installed into the base of the vessel 6. The battery 82 would power the micro speakers. This would allow a user to listen to music stored on their device but utilizes the base unit to be an optional speaker and power system to drive the playing of music or other media. In an alternate embodiment, a liquid crystal or LED display could be used as the lens 14 in the aperture 10 such that media such as videos could be played on the liquid crystal or LED display via connection of the display to the Bluetooth module located on the illumination module 62.

Figure 21:
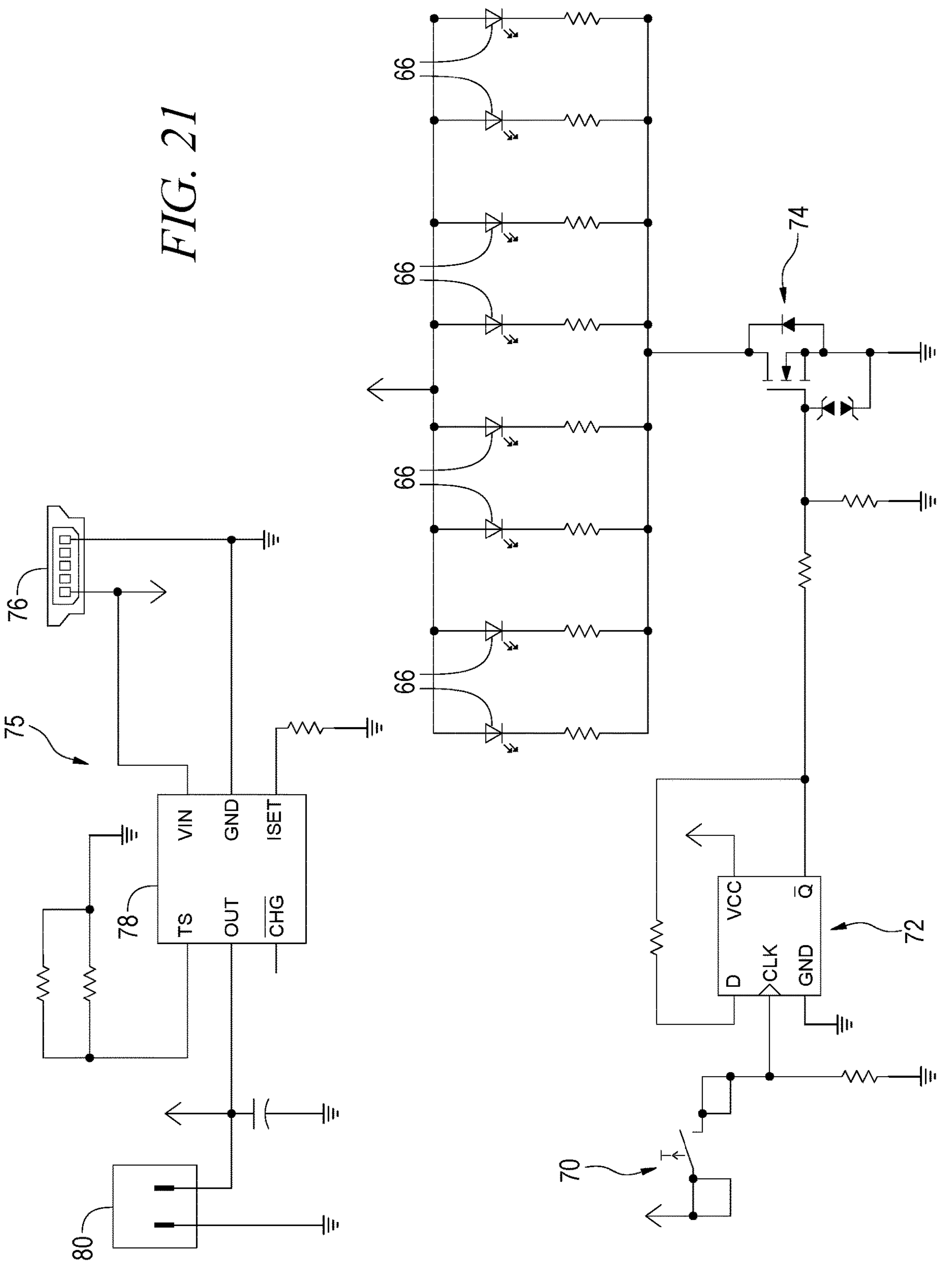
FIG. 21 is a schematic of the electrical circuit and components on the illumination module.

Referring now to FIG. 21, there is shown a schematic of the electrical circuit located embodied in the illumination module 62. The schematic shows a switch 70 connected a power source and further connected to a logic gate 72 that senses every time the switch 70 is depressed such that it makes electrical contact the logic gate 72 determines in what power state the circuit was last in and toggles the opposite power state. Additionally, there is shown an optional electrical switch 74 to be used in a future embodiment employing a carbon and gold pill on a silicone rubber button that makes contact with contacts on the circuit board 64 such that a mechanical tactile switch 70 is not required. Further shown is a plurality of LEDS 66 in parallel connection. There is also shown a charge circuit 75 having a mini Universal Serial Bus connector port 76, a charge controller 78 and a two pin battery connector 80. The charge circuit 75 allows the battery 82 to be charged. In an additional embodiment, another charge circuit 75 could be employed on the circuit board 64 that allows the battery 82 to discharge itself and charge a mobile device.

Figure 22:
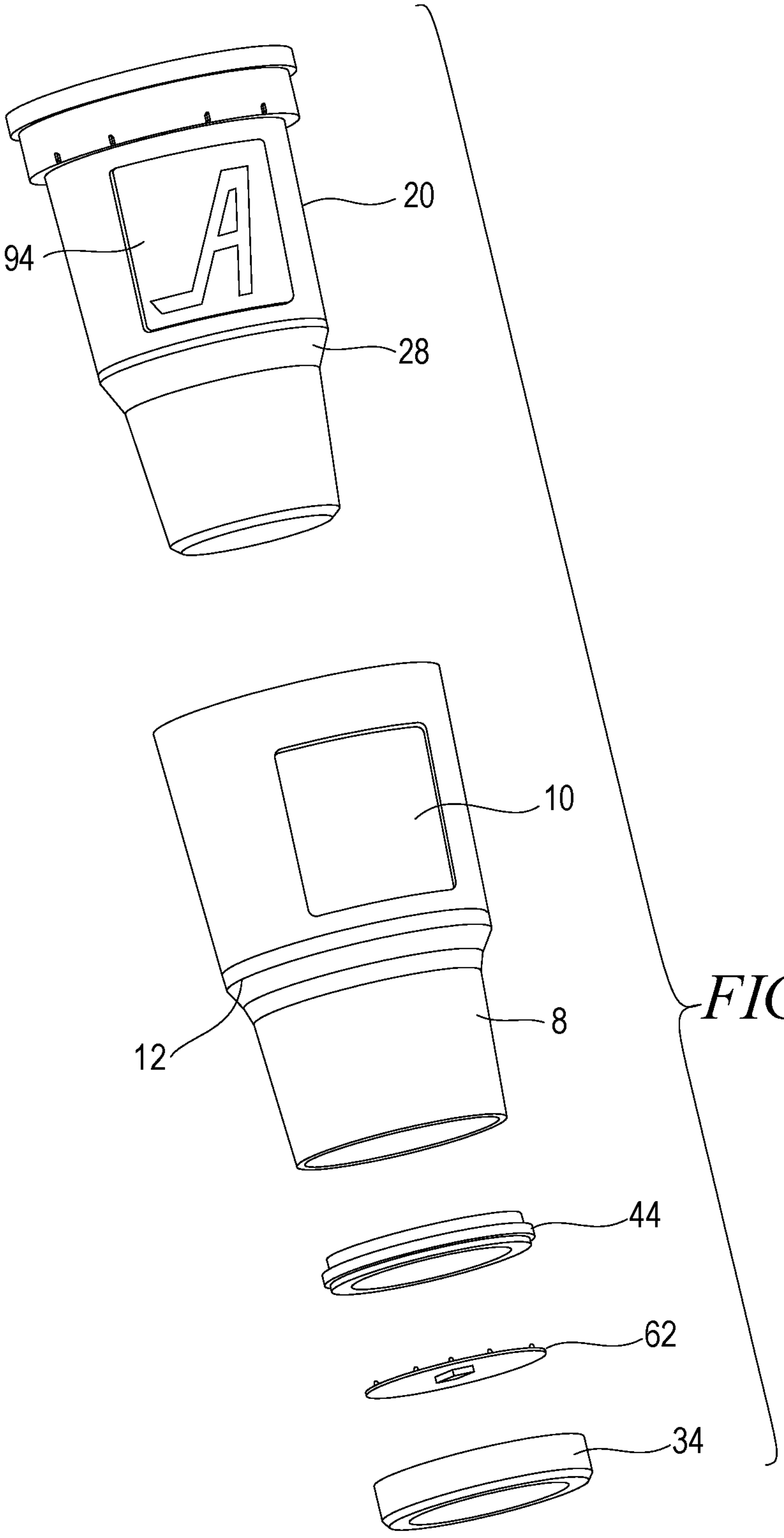
FIG. 22 is an exploded view of an alternate embodiment of the vessel.
Figure 23:
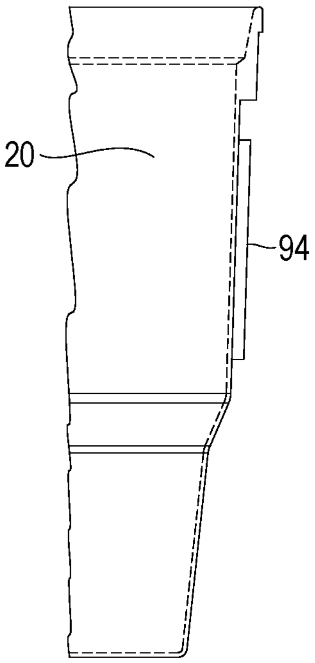
FIG. 23 is a side elevation of the inner liner of an alternate embodiment of the vessel.
Figure 24:
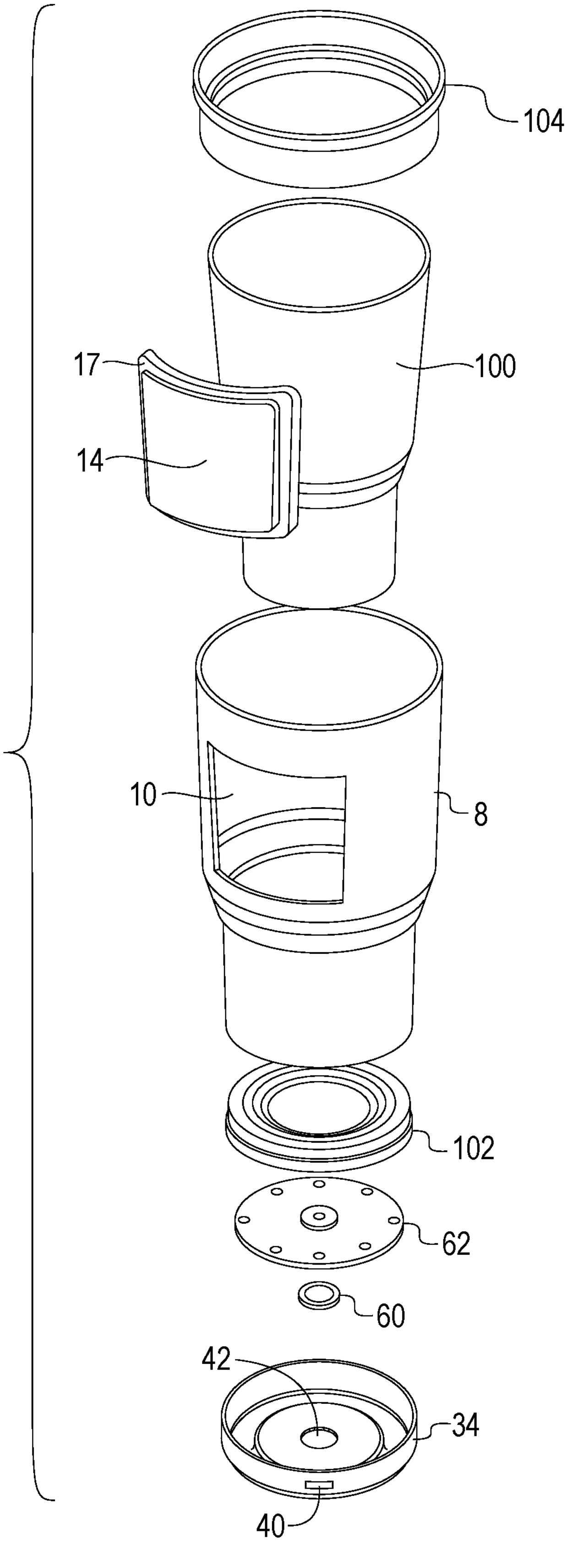
FIG. 24 is an exploded view of a further alternate embodiment of the vessel.
Figure 25:
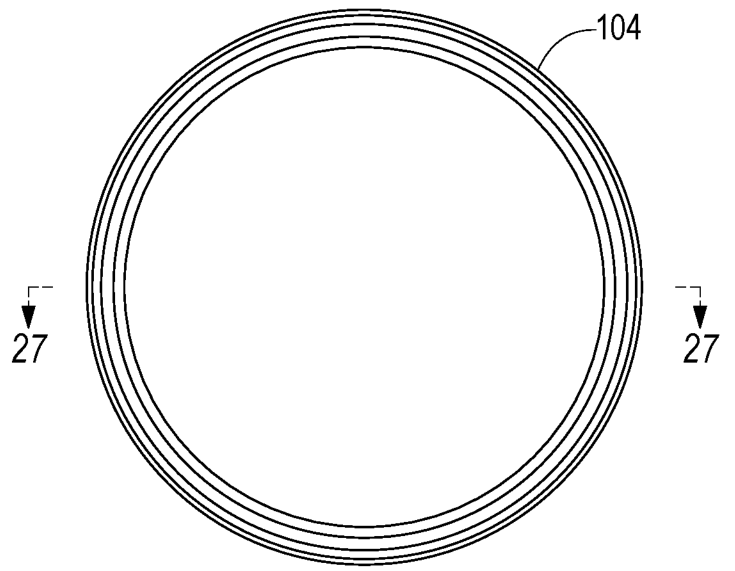
FIG. 25 is a top plan view of the upper connection ring.
Figure 26:
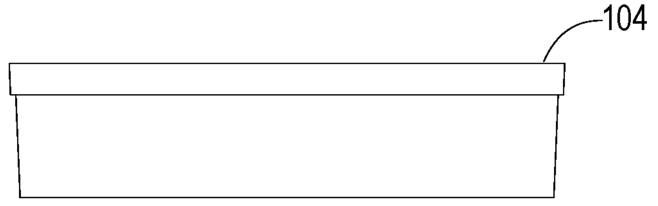
FIG. 26 is a side elevation view of the upper connection ring.
Figure 27:
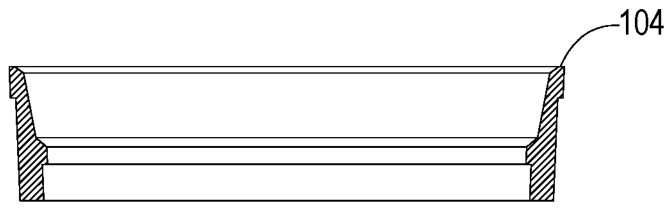
FIG. 27 is a cross-sectional view of the upper connection ring along the line 27-27 as shown in FIG. 25.
Figure 28:
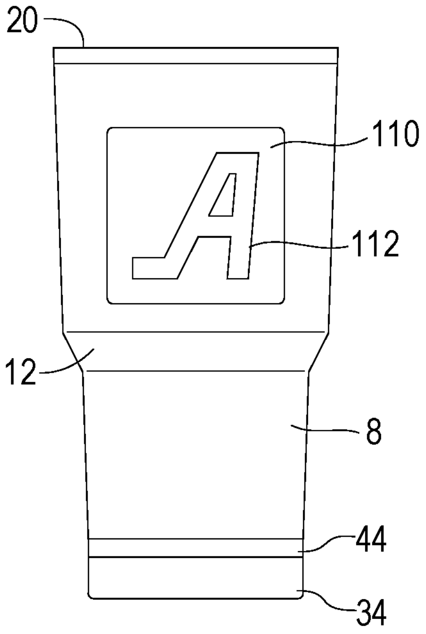
FIG. 28 is a side elevation of an embodiment of the vessel.
Figure 29:
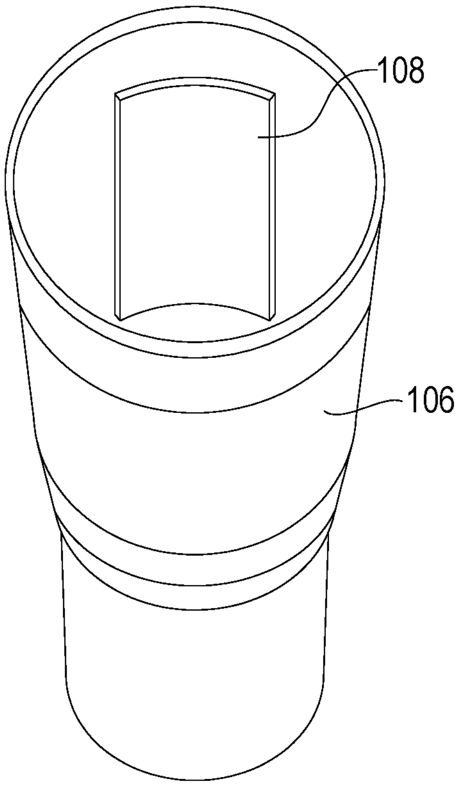
FIG. 29 is an upper perspective view of the vessel showing the protruded lens on the inner surface of the outer sleeve of the vessel.
Figure 30:
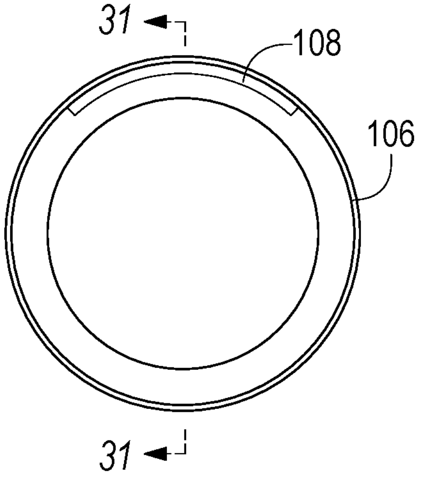
FIG. 30 is a top plan view of an embodiment of the outer sleeve.
Figure 31:
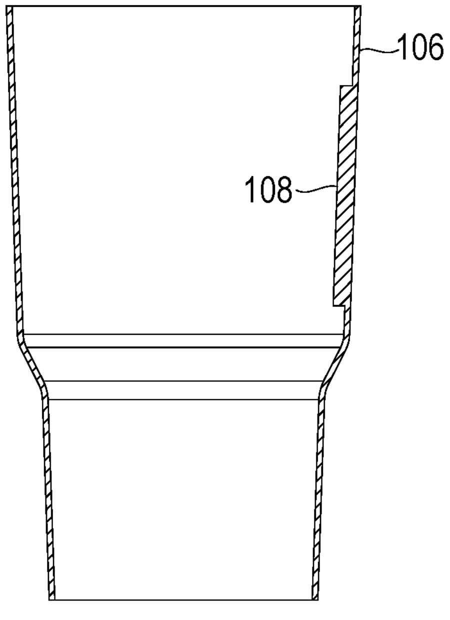
FIG. 31 is a cross section along line the line 30-30 as shown in FIG. 30.

Referring now to FIG. 22, there is shown an alternate embodiment of the vessel whereby the inner liner 20 has on its outer surface at least one protruding lens 94. The protruding lens 94 is formed onto the inner liner 20 during manufacture and is primarily made by the method of injection molding. This approach minimizes the components needed to make the vessel 6 by reducing the inner liner 20 and the lens 14 of the earlier described embodiments to a unitary piece formed by one mold. FIG. 23 shows a side elevation cross section showing the protruding lens 94 located on the side of the inner liner 20. The inner liner 20 and protruding lens 94 are translucent or transparent and can be clear or colored.

Referring now to FIGS. 24-27, there is shown a further alternative embodiment of the vessel 6 comprising an outer sleeve 8 having an aperture 10, an inner cup 100, a lower connector ring 102, an upper connector ring 104, an illumination module 62, a gasket 60, a base 34, and a lens 14. This embodiment can be made of metal or plastic materials, but from a structural point of view, metal would be preferred. The inner cup 100 and outer sleeve 8 are joined to the upper connector ring 104 by use of an appropriate adhesive. The lower connector ring 102 is joined to the bottom sidewall of the outer sleeve 8 and the bottom of the inner cup 100 via adhesive, a threaded connection or a gasket connection. The lens 14 would be installed into the aperture 10 using an adhesive. The base 34 is connected to the lower connector ring 102 by use of an adhesive, threaded connection or gasket connection. The base 34 and lower connector ring 102 encapsulate the illumination module 62. A gasket 60 is installed into the base 34 switch aperture 42 and there is also a charge aperture 40 located in the base 34. Both the upper connector ring 104, lower connector ring 102, and lens 14 are transparent or translucent and can be clear or colored. The hollow space created between the outer sleeve 8 and inner cup 100 by nature of their connection with the upper connector ring 104 and lower connector ring 102 allows light to be transmitted to the lens and the upper connector ring 104. Additionally, a reflective coating can be applied to the outer surface of the inner cup 100 and the inner surface of the outer sleeve 8 to help focus the light towards the lens 14 and the upper connector ring 104.

A further embodiment of the present invention would be a vessel 6 that does not have an aperture 10 in the outer sleeve 8, but comprises a removable base illumination unit 84 which comprises the base 34, the illumination module 62 and the connector ring 24. While the vessel 6 would not have the illuminated lens and indicia, it would still offer many benefits to users such that they can locate their drinking vessel 6 in dark environments and also use the removable base illumination unit 84. There are two versions of this embodiment. The first version would comprise the aforementioned outer sleeve 8 and inner liner 20 used in combination with the base illumination unit 84. The connector ring 24 would either be threaded on its top side or have a gasket 60 installed there around its top edge for connection to the bottom interior of the outer sleeve 8 having an inner liner 20. The second version of this embodiment would use a vessel 6 having a sidewall and a bottom. In addition, the bottom would in one embodiment have a flanged edge such that it continues downward below the bottom of the vessel 6 thereby allowing threads to be formed therein, or a threaded sleeve insert that could be adhered into the bottom interior of the flanged edge such that the base illumination unit 84 can be installed.

Referring now to FIGS. 28-31 there is shown another embodiment of the present invention where the outer sleeve 106 is made of transparent or translucent plastic. Using paint or some other suitable light impeding coating, the outer sleeve 106 can be painted and coated such that the outer sleeve 106 is completely opaque or unclear except for a window 110 that is formed in the shape of the above-mentioned embodiments of the lens 14. This window 110 would be transparent or translucent and an indicia 112 could be printed on the window 110 or a decal or sticker could be placed on the window 110. In one embodiment, the decals or stickers would display indicia 112 that ideally would be transparent or translucent. This embodiment would be suitable for the present invention's intended purposes, but it could further be enhanced by having the outer sleeve 106 made of transparent or translucent plastic and having a protruding lens 108 on the interior of the outer sleeve 106. Because the protruding lens 108 intrudes into the hollow space between the outer sleeve and inner liner 20 or inner cup 100 the protruding lens 108 captures light by obstructing the hollow space though which light is transmitting up through from the illumination module 62. The light hits the lens 108 and thereby diffuses through said protruding lens 108 illuminating the indicia 112. In one embodiment, forming the protruding lens 108 out of a translucent material may be a preferred embodiment as translucent material refracts and reflects light within the material thus enhancing the glowing effect. This outer sleeve 106 would be coated either on the outer and inner surface of the outer sleeve 106 or both with paint or some other type of suitable attractive coating that would render the remainder of the outer sleeve opaque and/or fully light blocking except for the protruding lens 108 and window 110. The outer sleeve 106 and protruding lens 108 would be formed by the method of injection molding.

Figure 33:
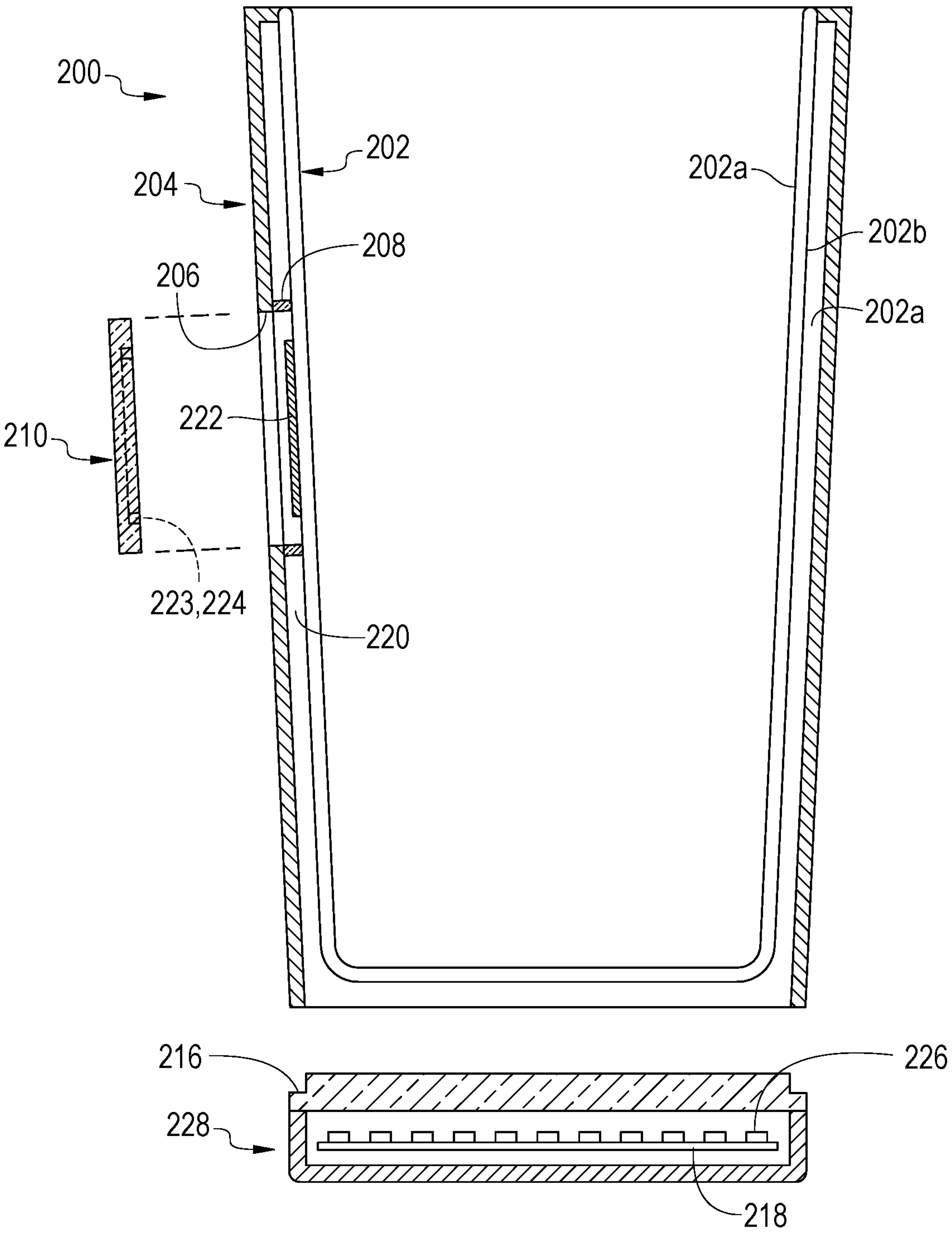
FIG. 33 is a cross-sectional view of a further embodiment of the drinking vessel.
Figure 34:
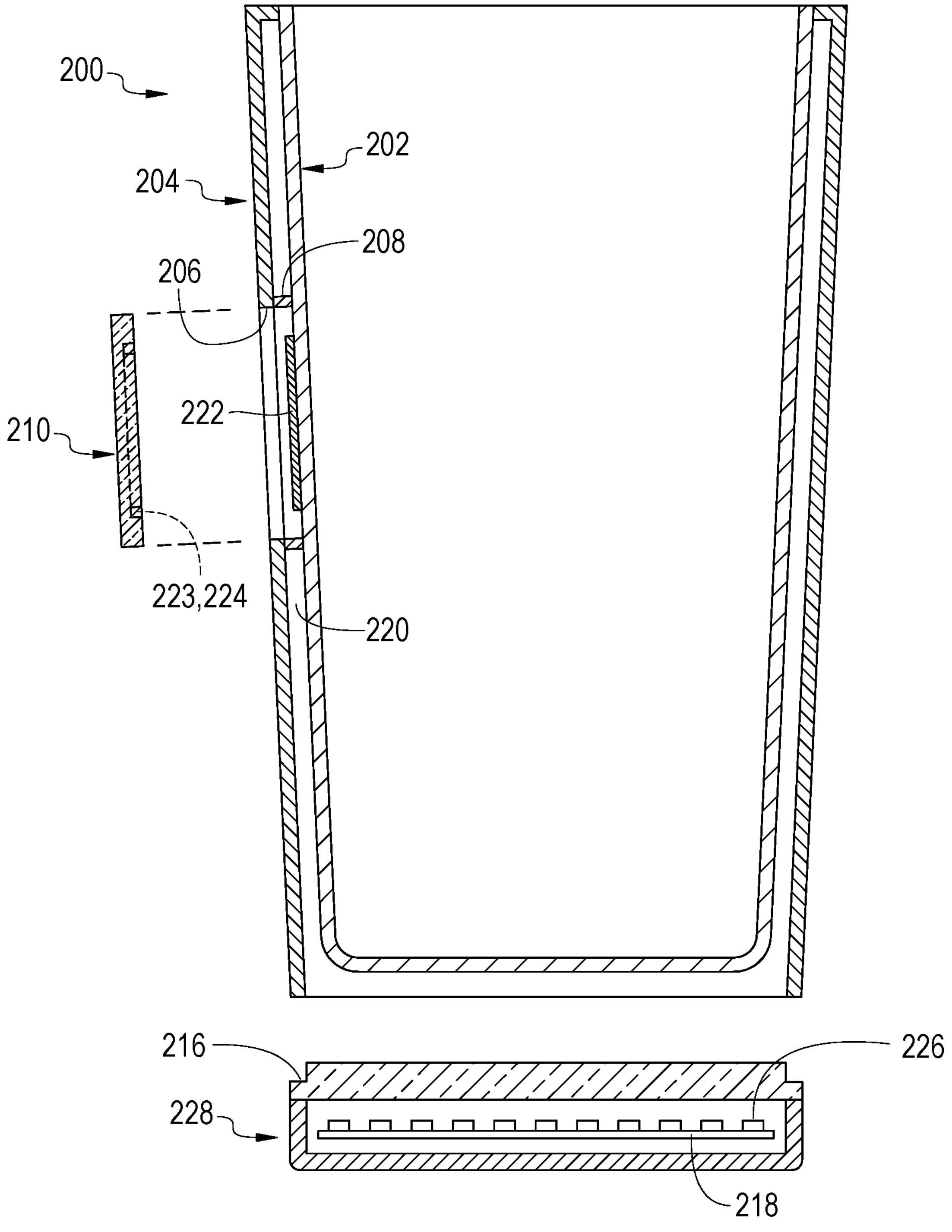
FIG. 34 is a cross-sectional view of a further embodiment of the drinking vessel.
Figure 35:
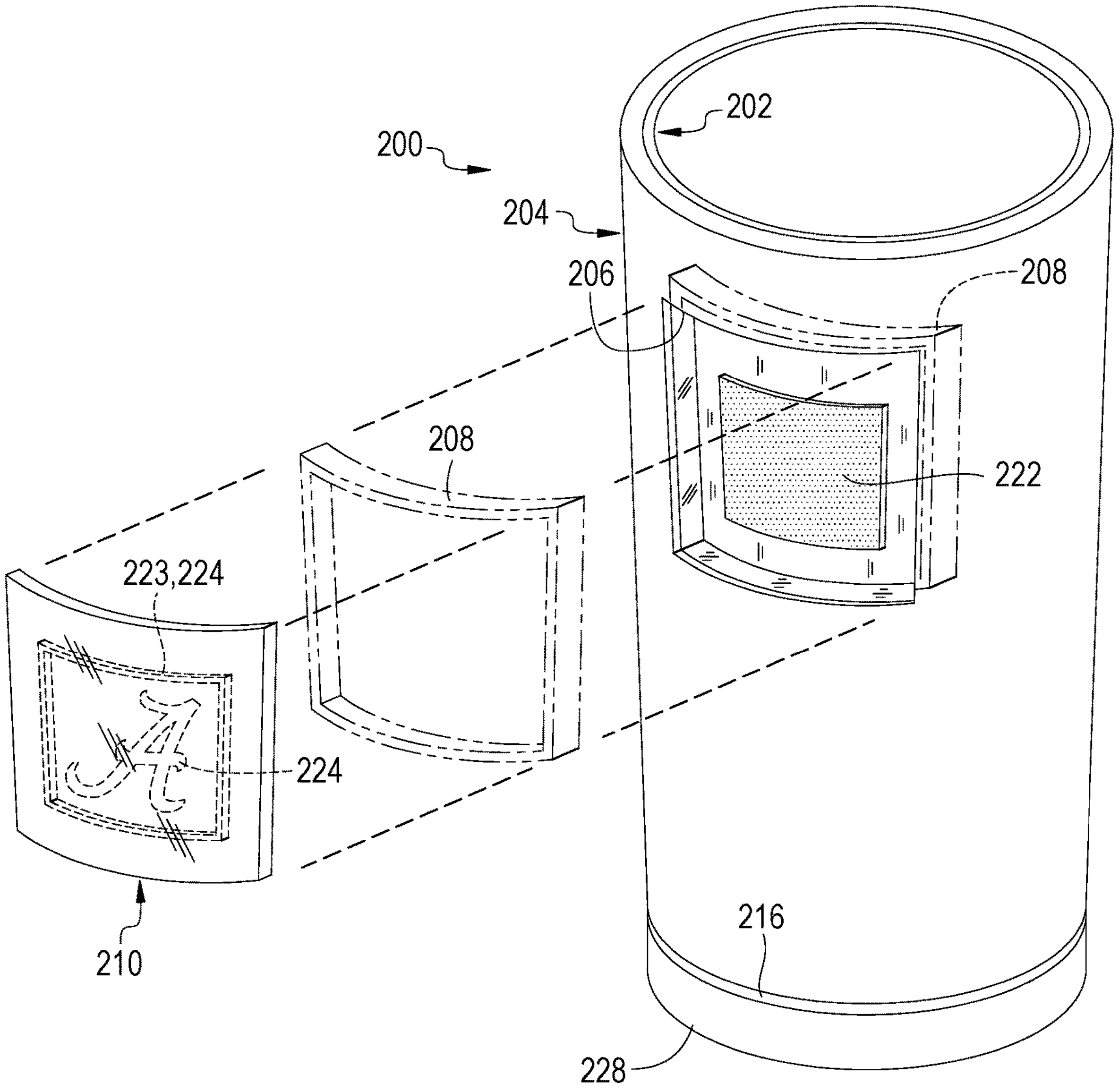
FIG. 35 is a perspective view of a further embodiment of the drinking vessel whereby an exploded view of a removable lens and transparent are shown.
Figure 36:
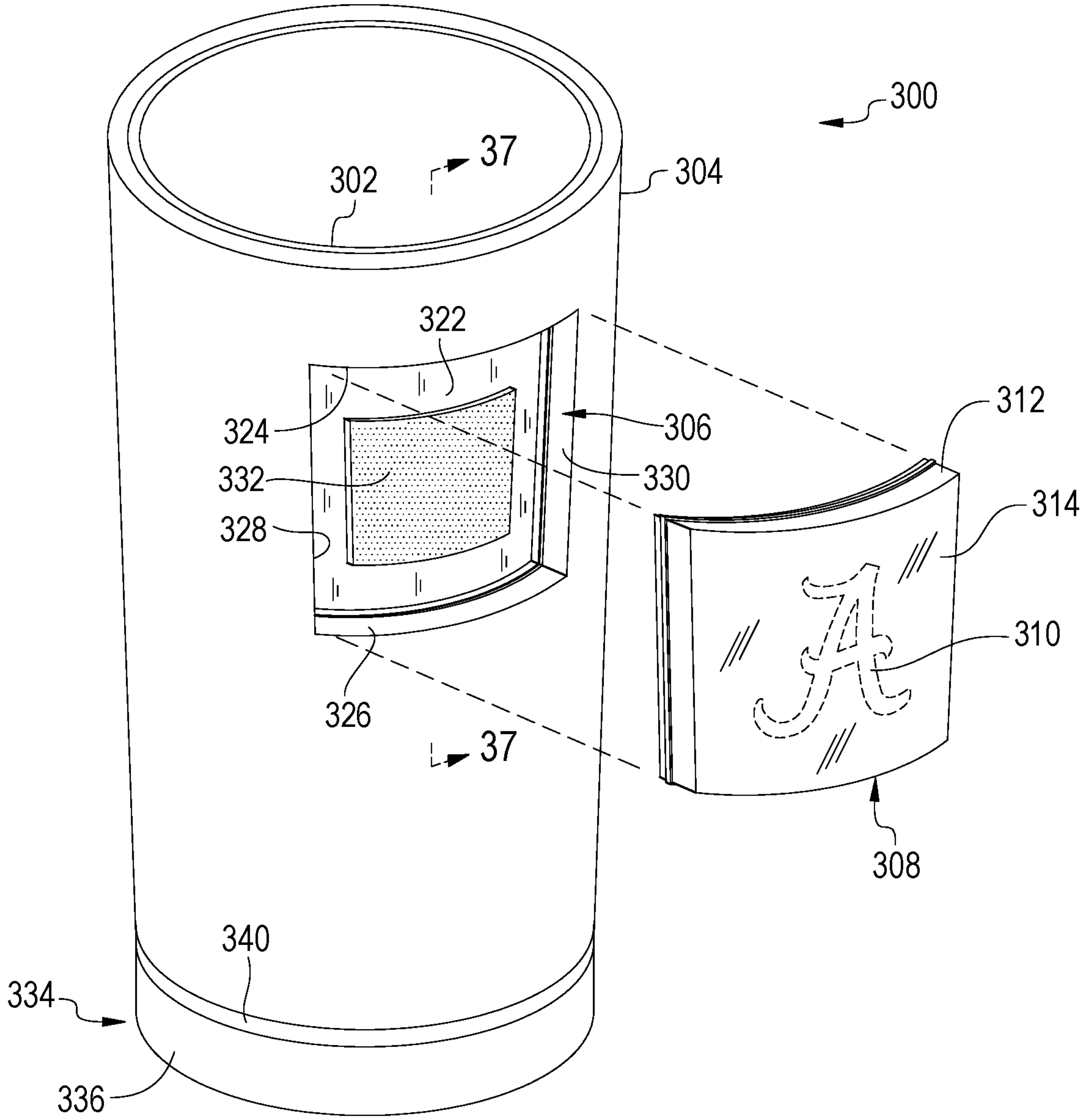
FIG. 36 is a perspective view of a further embodiment of the drinking vessel whereby an exploded view of a removable lens unit is shown.
Figure 37:
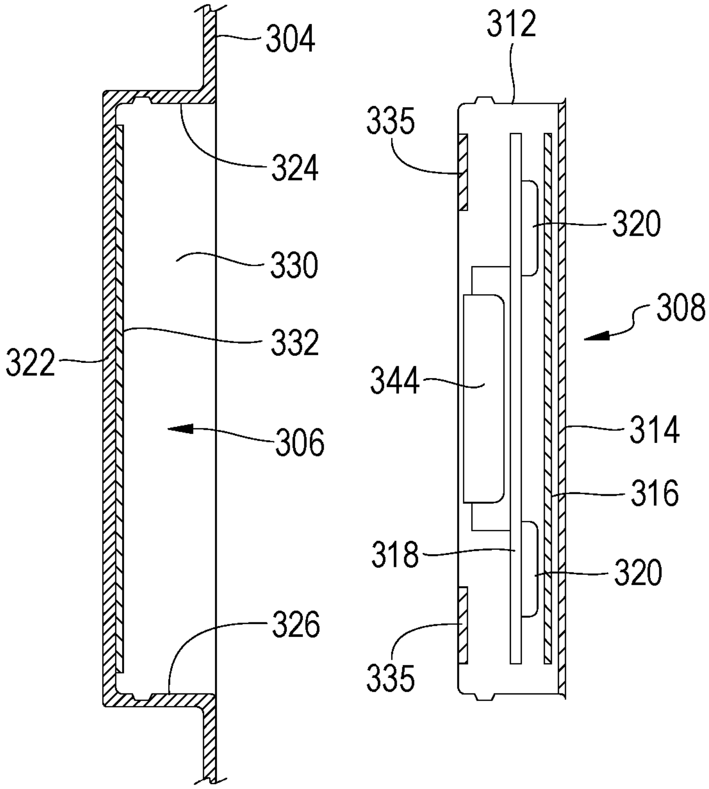
FIG. 37 is partial cross-section view of the drinking vessel and cavity as well as the lens unit.
Figure 38:
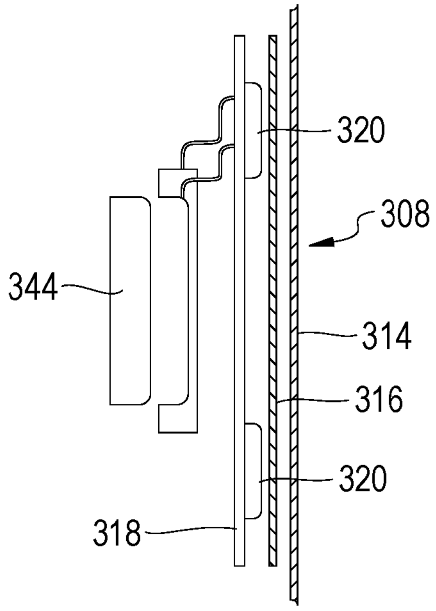
FIG. 38 is a side plane view of the components of the lens unit.

The following is provided for purposes of understanding materials (plastic, polycarbonate, acrylic, metal, etc. as previously described) and techniques in manufacturing that can be used in the embodiments of the invention and hereby are incorporated into the specification. Referring now to FIGS. 33-35 there is shown an alternate embodiment of the drinking vessel 200 having a transparent or translucent lens 210 that is removable from the drinking vessel 200. This allows a user to exchange one lens 210 for another lens 210 bearing different indicia 214. The drinking vessel 200 has an inner cup 202 portion and an outer non-transparent sidewall 204 that has an aperture 206 formed therein. The inner cup 202 in a further embodiment can have a interior sidewall 202*a* and an exterior sidewall 202*b* whereby the interior sidewall 202*a* and the exterior sidewall 202*b* are joined at their top edges via a weld and vacuum sealed. The interior sidewall 202*a* floats inside the exterior sidewall 202*b* and maintains rigid position via the welded connection mentioned directly above whereby there is a hollow space maintained between the interior sidewall 202*a* and the exterior sidewall 202*b* such that in a vacuum sealed state the hollow space prevents transmission of heat via convection and conduction. Inside and adjacent and underneath the foot print of the aperture 206 there is a transparent frame 208 that is installed using adhesive contact between the inner cup 202 and the interior surface of the no-transparent sidewall 204. The transparent frame 208 allows for the interior void 220 of the drinking vessel 200 to stay sealed and in one embodiment also vacuum sealed. The transparent frame 208 further allows light to pass through the transparent frame 208 and into the lens 210 to illuminate the lens 210 and the indicia 214. The lens 210 is removable from the drinking vessel 200 and installable into the aperture 206 of the drinking vessel. Various means could be used to maintain the lens 210 in position inside the aperture 206. One such means is to install a magnetic surface 222 on the outside of the inner cup 202 in the footprint of the aperture 206 of the outer non-transparent sidewall 204. The magnetic surface 222 could be individual magnets or magnetic strips adhered to the inner cup or the magnetic surface could be magnetic paint applied and coated on to the inner cup 202. Further, the lens 210 on its interior surface could have a metal or magnetic portion 224 adhered thereto. Further, the lens itself could have a metal portion 224 or a magnet 223 molded into the actual lens 210 itself such that when the lens 210 is placed flush into the aperture 206 the magnetic surface's 222 magnetic field engages the metal portion 224 or magnetic portion 223 and brings the lens 210 firmly resting against magnetic surface. A further means of maintaining the lens 210 in flush position inside the aperture would be to install hook and loop fasteners onto the inner cup 202 in the footprint of the aperture 206 and to the rear or interior surface of the lens 210. Removal of the lens could be achieved by using and engaging a suction cup onto the exterior surface of the lens 210 and gently pulling the lens 210 out of the aperture 206. Additionally, removal of the lens 210 could be achieved by having a small cutout or divot on the outside edge of the lens 210 that would allow a user to gently pry the lens 210 away from the magnetic field being exerted by the magnetic surface 222. The light source would be as shown in FIGS. 13-21 as previously described and in FIGS. 33-35. The light source is a base illumination unit comprised of a base 228, a connector ring 216 and an illumination module 218 having light emitting diodes 226 on its upper surface and the base illumination unit is removable in certain embodiments of the invention.

Figure 39:
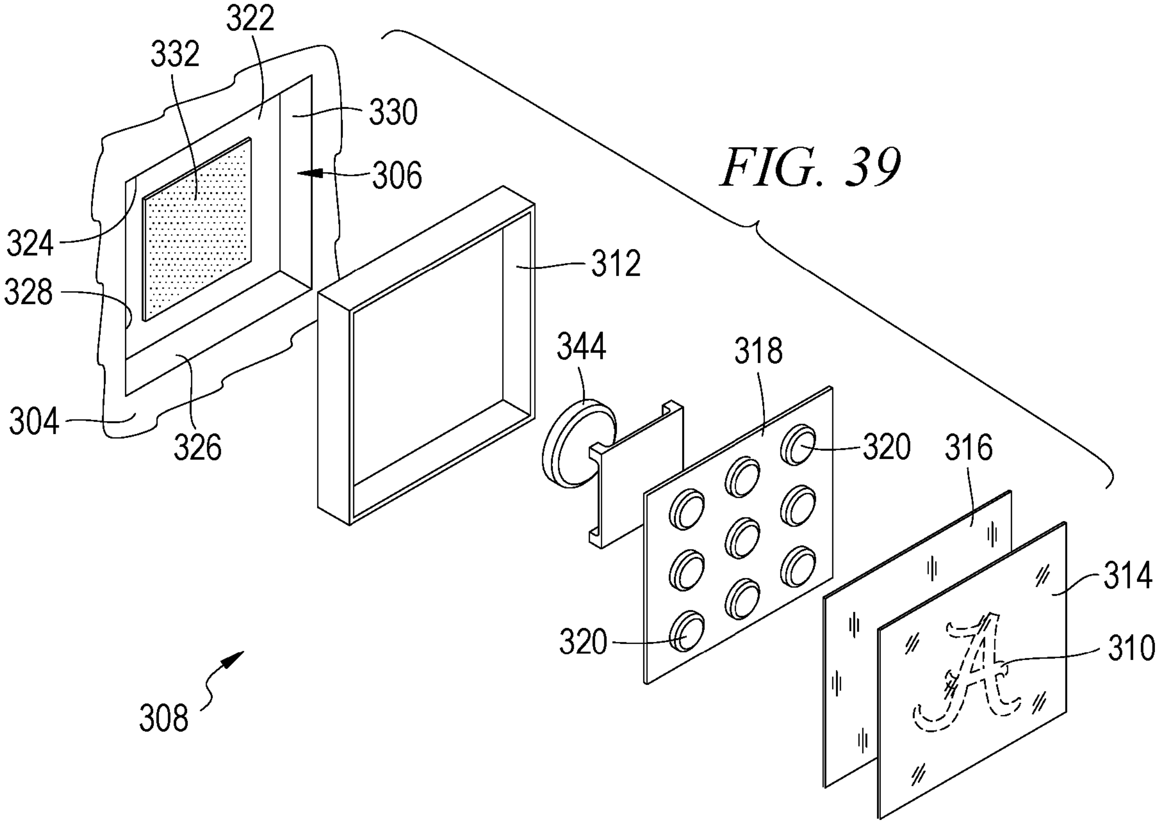
FIG. 39 is an exploded perspective of the lens unit and components.
Figure 40:
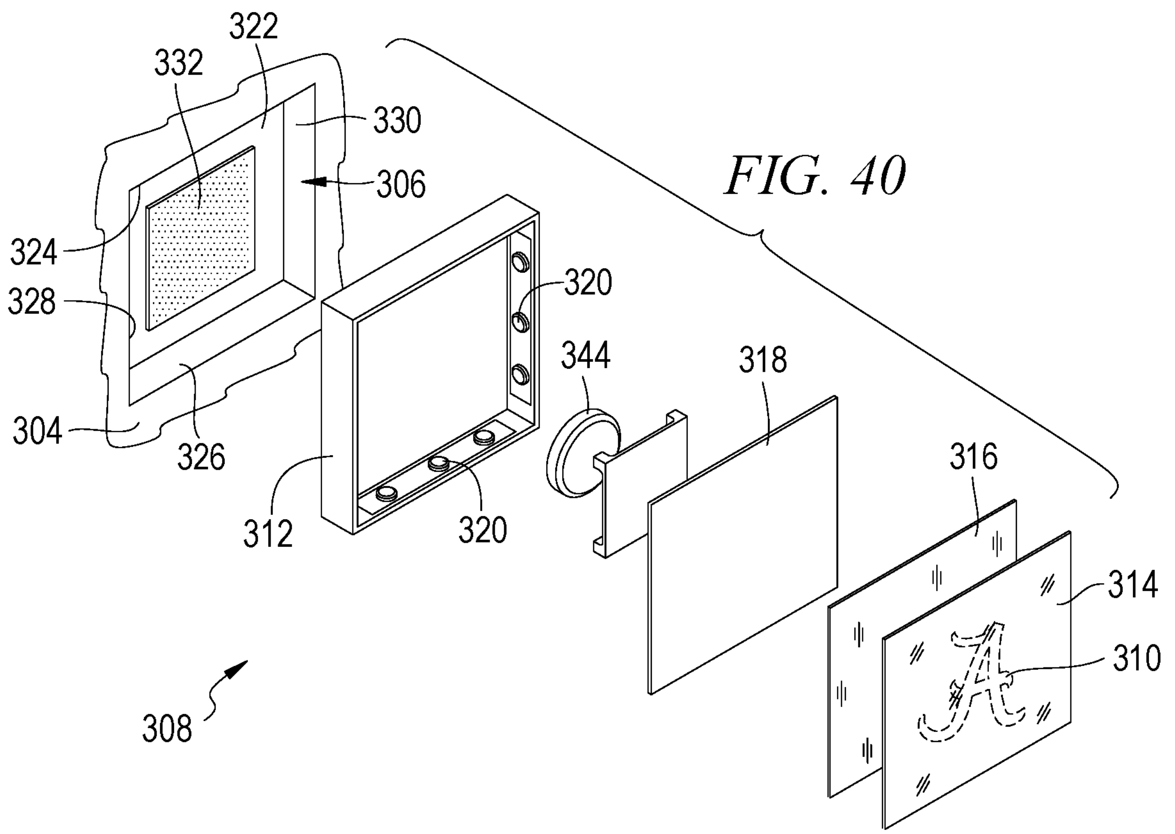
FIG. 40 is an exploded view of alternate embodiment of the lens unit.
Figure 41:
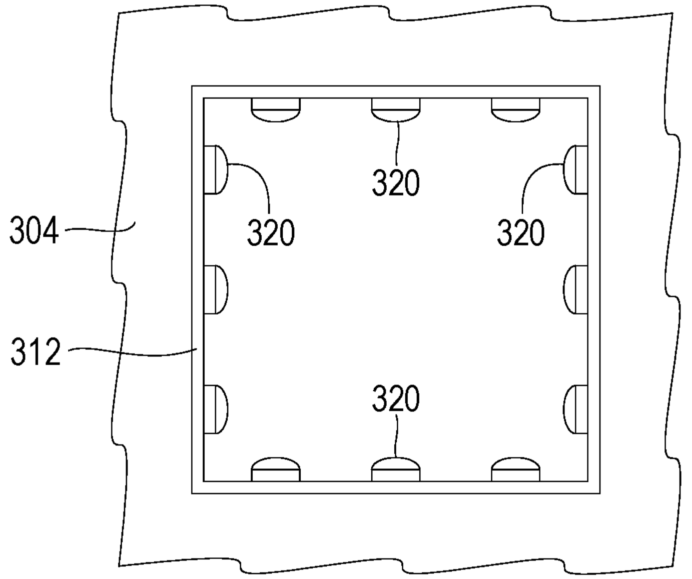
FIG. 41 front plan view of the outer housing of the lens unit showing light emitting diodes mounted on the inner walls of the outer housing.

Referring now to FIGS. 35 & 36-41 there is shown a further alternate embodiment of the drinking vessel 300 having a metal outer sidewall 304 and an inner cup 302 whereby said metal outer sidewall 304 has a cavity 306 that has been stamped into the metal outer sidewall 304. The cavity 306 has a rear wall 322, a top sidewall 324, a bottom sidewall 326, a left sidewall 328, and right sidewall 330. The cavity 306 is purposed to receive a lens unit 308 as shown whereby the lens unit 308 is self-contained and comprised of an outer housing 312, a transparent front lens plate 314 having an indicia 310 located on the transparent front lens plate 314, an opaque inner plate 316 that is in front an electronic circuit board 318 an behind the opaque inner plate 316. The electronic circuit board in one embodiment has light emitting diodes 320 on its outward facing surface as shown in FIG. 39. In an alternate embodiment as shown in FIGS. 40-41, the outer housing 320 can have a plurality of light emitting diodes or LED strip lights located on the inner sidewall of the outer housing such that light is directed across the lens unit 308 behind the opaque inner plate 316 so that hotspots of light in the lens unit 308 are minimized. Located also in the lens unit 308 is a power source such as a coin type battery or a lithium polymer rechargeable battery 344. The lens unit 308 can have a recharging circuit located on the electronic circuit board and a charging port located in the outer housing 308. The lens unit 308 is removable from the drinking vessel 300 and installable into the lens cavity 306 of the drinking vessel. Various means could be used to maintain the lens 308 in position inside the lens cavity 306. One such means is to install a magnetic surface 332 on the outside of the inner cup 302 on the rear wall 322 of the cavity 306. The magnetic surface 332 could be individual magnets or magnetic strips adhered to the inner cup or the magnetic surface could be magnetic paint applied and coated on to the rear wall 322 of the cavity 306. Further, the lens unit 308 could have a metal or magnetic portion 224 adhered to the back surface of the outer housing. Alternately, the lens unit 308 itself could have a metal portion 333 or a magnet 335 located in the lens unit 308 itself such that when the lens unit 308 is installed into the lens cavity 306 the magnetic surface's 332 magnetic field engages the metal portion 333 or magnet 335 and brings the lens unit 308 firmly resting against the magnetic surface 332 located on the rear wall 322 of the lens cavity 306. A further means of maintaining the lens unit 308 in flush position inside the aperture would be to install hook and look fasteners onto the rear wall 322 of the lens cavity 306 and to the back of the outer housing 312 of the lens unit 308. Removal of the lens unit could be achieved by using and engaging a suction cup onto the exterior surface of the lens unit 308 and gently pulling the lens unit 308 out of the lens cavity. Additionally, removal of the lens unit 308 could be achieved by having a small cutout or divot on the outside edge of the lens unit 308 that would allow a user to gently pry the lens unit 308 away from the magnetic field being exerted by the magnetic surface 332. The drinking vessel 300 in a further embodiment can have an incorporated base illumination unit 334 as fully described above and in FIGS. 13-21. The base illumination unit 334 has a base 336 connectable to a transparent or translucent connector ring 340 and an illumination module 338 located in between the connector ring 340 and the base illumination unit 334. Additionally, the drinking vessel can have a transparent or translucent upper connector ring 342 whereby the inner cup 302 and the metal outer sidewall 304 are joined to the upper connector ring 340 at their top edge and whereby light from the base illumination unit 334 transmits through a void 346 located in between the inner cup 302 and metal outer sidewall 304. Additionally, the drinking vessel 300 can optionally be vacuum sealed. Further, the inner cup 302 can have an inner wall and an outer sidewall whereby the inner wall and outer sidewall are welded are at their top edges and vacuum sealed.

Figure 32:
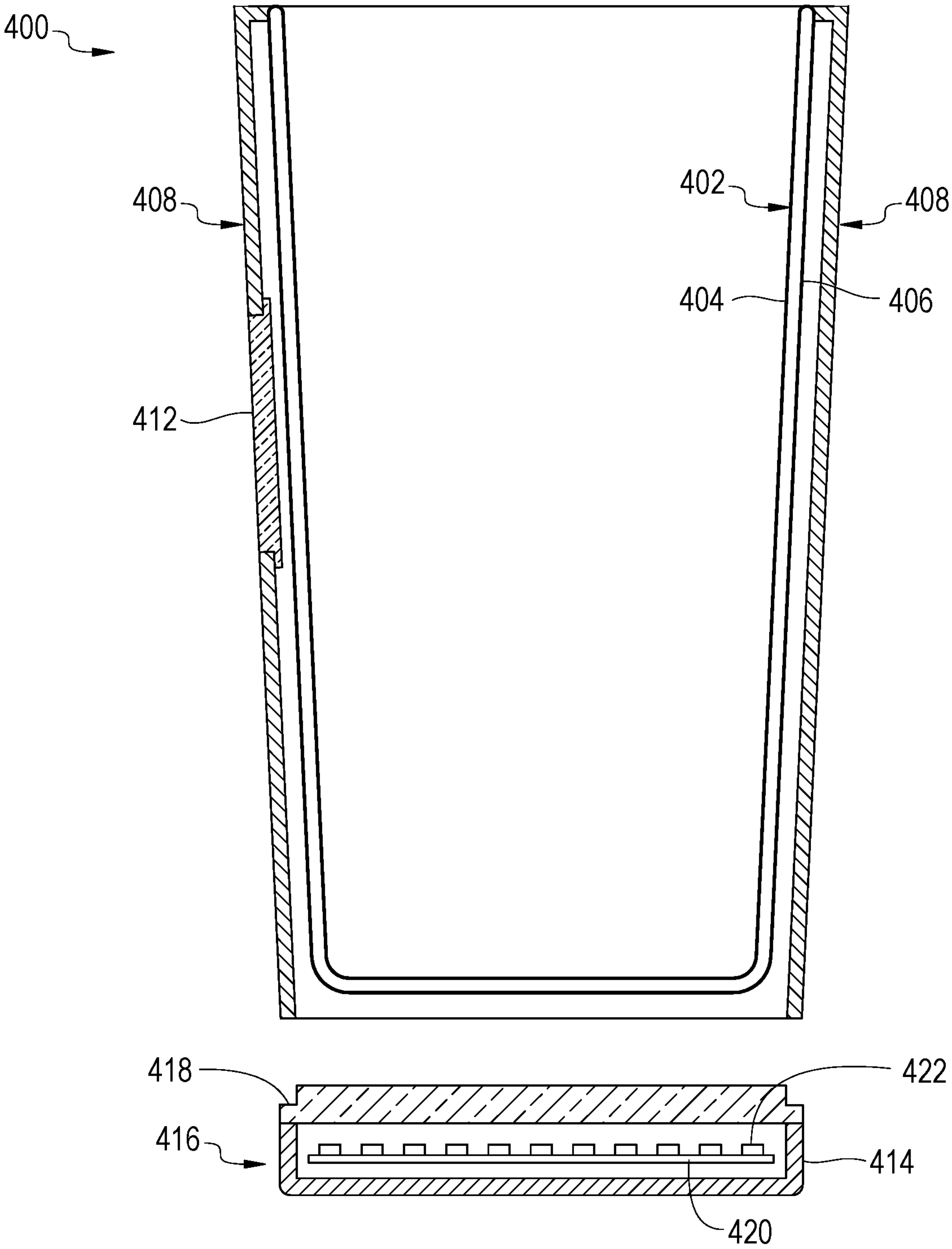
FIG. 32 is cross-sectional view of a further embodiment of the drinking vessel.

Referring now to FIG. 32 a further embodiment of the drinking vessel 400 is shown whereby the drinking vessel 400 has an inner vessel 402 and said inner vessel 402 has an interior sidewall 404 and exterior sidewall 406 whereby the interior sidewall 404 is welded to the exterior sidewall 406 and vacuum sealed. Further shown is an outer non-transparent sidewall 408 that is joined to the inner vessel 402 at the top edge of the inner vessel 402 where the interior sidewall 404 and exterior sidewall 406 are joined and further joined to the top edge of the outer transparent sidewall 408. There is also shown an aperture 410 formed in the outer non-transparent sidewall 408 and is adapted to receive a transparent or translucent lens 412. The outer non-transparent sidewall 408 bottom edge is connected to a removable base illumination unit 416 having a base 414 that contains an illumination module 420 whereby the illumination module 420 has light emitting diodes on its top surface having a light source. As shown in FIGS. 13-21 and further described above and in FIG. 32 there is shown a base illumination unit 416 comprised of a base 414, a transparent or translucent connector ring 418, and an illumination module 420 having light emitting diodes on its top surface.

To aid in connection of the base illumination in any of the aforesaid embodiments and as an alternate means as herein described above, there could be provided a transparent circular mounting plate made of suitable plastic that is permanently mounted in the bottom of the drinking vessel inside the outer non-transparent sidewall and under the inner cup or vessel. Further, it can have pegs formed in it bottom surface that conform to slots that can be located in the top of the upper connector ring for quick attachment and release whereby the pegs are insertable into the slots and a user twists the base illumination a rotation of degree to lock into place the base illumination unit onto the drinking vessel.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

Enumerated Elements

200 drinking vessel
202 inner cup
202*a* interior sidewall
202*b* exterior sidewall
204 outer non-transparent sidewall
206 aperture
208 transparent frame
210 transparent or translucent lens
212 light source
214 indicia
216 connector ring
218 illumination module
220 void
222 magnetic surface
223 magnet
224 metal portion
226 light emitting diodes
228 base illumination unit
300 drinking vessel
302 inner cup
304 metal outer sidewall
306 lens cavity
308 lens unit
310 indicia
312 outer housing
314 transparent front lens plate
316 opaque inner plate
318 electronic circuit board
320 light emitting diodes
322 rear wall
324 top sidewall
326 bottom sidewall
328 left sidewall
330 right sidewall
332 magnetic surface
333 metal portion
334 base illumination unit
335 magnet
336 base
338 illumination module
340 connector ring
342 upper connector ring
344 battery
346 void
400 drinking vessel
402 inner vessel
404 interior sidewall
406 exterior sidewall
408 outer non-transparent sidewall
410 aperture
412 lens
414 base
416 base illumination unit
418 connector ring
420 illumination module
422 light emitting diode

What is claimed is:

1. A drinking vessel, comprising:
an outer non-transparent sidewall;
an inner vessel joined to an outer non-transparent cup sidewall whereby the inner vessel is located inside said outer non-transparent cup sidewall and said inner vessel has a top edge that is joined to a top edge of said outer non-transparent cup sidewall whereby said drinking vessel is double walled;
a vacuum sealed connection of the outer non-transparent sidewall to the inner vessel in the vicinity of a bottom edge of the outer non-transparent sidewall and the bottom edge of said inner vessel of said drinking vessel;
a base illumination unit that joins to the bottom of said drinking vessel whereby said base illumination unit has a power source, a light source, and a switch.

2. The drinking vessel of claim 1 whereby said base illumination unit is comprised of a base, an illumination module and a transparent or translucent connector ring whereby the base and transparent or translucent connector ring encapsulate the illumination module and whereby the base illumination unit is removable and attachable to the bottom of the drinking vessel via means of attachment and detachment.

3. The clinking vessel of claim 2 whereby the illumination module has at least one or more light emitting diodes located on a top surface of a circuit board located in said base illumination unit that is connected to a power source located in the base illumination unit.

4. The drinking vessel of claim 3 whereby said illumination module projects light through a top of said transparent or translucent connector ring and disperses light through a side edge of said transparent or translucent connector ring.

5. The drinking vessel of claim 4 wherein the illumination module has a printed circuit board, rechargeable battery, a charging circuit, and a reverse charging circuit such that the rechargeable battery can charge a mobile device via a charging port located in the base illumination unit and said switch that allows the unit to be powered on and off.

6. The drinking vessel of claim 5 wherein the light emitting diodes can be at least one of a white light emitting, a red light emitting diode, a green light emitting diode, a blue light emitting diode, an ultra-violet light emitting diode, a red-green-blue light emitting diode, and a red-green-blue-white light emitting diode and further comprising a wireless module located on the circuit board capable of communicating with a user's mobile device using a downloadable interface such that a user can change the color of light emanating out of the lens unit.

7. The drinking vessel of claim 6 whereby the base illumination unit houses at least one speaker that is in connection with the power source and the wireless module that allows a user to link a mobile device to the wireless module in the base illumination unit such that a user can play music or other media through the base illumination unit speaker or speakers.

8. The drinking vessel of claim 1 wherein the light source is a light emitting diode and said light emitting diode can be at least one of a white light emitting diode, a red light emitting diode, a green light emitting diode, a blue light emitting diode, an ultra-violet light emitting diode, a red-green-blue light emitting diode, and a red-green-blue-white light emitting diode.

9. A drinking vessel, comprising:
an outer non-transparent sidewall:
an inner vessel joined to said outer non-transparent sidewall whereby the inner vessel is located inside said outer non-transparent cup sidewall and said inner vessel has a top edge that is joined to a top edge of said outer non-transparent cup sidewall whereby said drinking vessel is double walled;

at least one aperture formed in the outer non-transparent sidewall;

a transparent or translucent lens conformed to fit into said at least one open aperture of said outer non-transparent sidewall and capable of transmitting light;

a light source located in a base illumination unit of said drinking vessel whereby said light source transmits light upwards through a void between the outer non-transparent sidewall and the inner vessel and said base illumination unit further has a power source and a switch.

10. The drinking vessel of claim 9 further comprising an indicia located on the lens.

11. The drinking vessel of claim 10 whereby said base illumination unit is comprised of a base, an illumination module and a transparent or translucent connector ring whereby the base and transparent or translucent connector ring encapsulate the illumination module and whereby the base illumination unit is removable and attachable to the bottom of the drinking vessel via means of attachment and detachment.

12. The drinking vessel of claim 11 whereby the illumination module has at least one or more light emitting diodes located on a top surface of a circuit board located in said base illumination unit that is connected to the power source located in the base illumination unit.

13. The drinking vessel of claim 12 whereby said illumination module projects light through a top of said transparent or translucent connector ring and disperses light through a side edge of said transparent or translucent connector ring.

14. The drinking vessel of claim 13 wherein the illumination module has a printed circuit board, rechargeable battery, a charging circuit, and a reverse charging circuit such that the rechargeable battery can charge a mobile device via a charging port located in the base illumination unit and said switch that allows the unit to be powered on and off.

15. The drinking vessel of claim 14 wherein the light emitting diodes can be at least one of a white light emitting diode, a red light emitting diode, a green light emitting diode, a blue light emitting diode, an ultra-violet light emitting diode, a red-green-blue light emitting diode, and a red-green-blue-white light emitting diode and further comprising a wireless module located on the circuit board capable of communicating with a user's mobile device using a downloadable interface such that a user can change the color of light emanating out of the lens unit.

16. The drinking vessel of claim 15 whereby the base illumination unit houses at least one speaker that is in connection with the power source and the wireless module that allows a user to link a mobile device to the wireless module in the base illumination unit such that a user can play music or other media through the base illumination unit speaker or speakers.

17. The drinking vessel of claim 9 wherein the light source is a light emitting diode and said light emitting diode can be at least one of a white light emitting diode, a red light emitting diode, a green light emitting diode, a blue light emitting diode, an ultra-violet light emitting diode, a red-green-blue light emitting diode, and a red-green-blue-white light emitting diode.

* * * * *